US012581482B2

(12) United States Patent
Tseng et al.

(10) Patent No.: US 12,581,482 B2
(45) Date of Patent: Mar. 17, 2026

(54) DATA TRANSMISSION MANAGEMENT IN RADIO RESOURCE CONTROL (RRC) INACTIVE STATE

(71) Applicant: SHARP KABUSHIKI KAISHA, Sakai City (JP)

(72) Inventors: Yung-Lan Tseng, Taipei (TW); Hsin-Hsi Tsai, Taipei (TW); Hung-Chen Chen, Taipei (TW); Mei-Ju Shih, Taipei (TW)

(73) Assignee: SHARP KABUSHIKI KAISHA, Sakai City (JP)

( * ) Notice: Subject to any disclaimer, the term of this patent is extended or adjusted under 35 U.S.C. 154(b) by 533 days.

(21) Appl. No.: 17/924,779

(22) PCT Filed: May 13, 2021

(86) PCT No.: PCT/CN2021/093616
§ 371 (c)(1),
(2) Date: Nov. 11, 2022

(87) PCT Pub. No.: WO2021/228197
PCT Pub. Date: Nov. 18, 2021

(65) Prior Publication Data
US 2023/0180223 A1     Jun. 8, 2023

Related U.S. Application Data

(60) Provisional application No. 63/024,409, filed on May 13, 2020.

(51) Int. Cl.
*H04W 72/1268*     (2023.01)
*H04W 74/04*     (2009.01)
(Continued)

(52) U.S. Cl.
CPC ....... *H04W 72/1268* (2013.01); *H04W 74/04* (2013.01); *H04W 74/0833* (2013.01); *H04W 74/0836* (2024.01); *H04W 74/0838* (2024.01)

(58) Field of Classification Search
CPC ............. H04W 72/1268; H04W 74/04; H04W 74/0833
See application file for complete search history.

(56) References Cited

U.S. PATENT DOCUMENTS

| 2018/0302914 A1 | 10/2018 | da Silva et al. |
| 2019/0215749 A1 | 7/2019 | Shih et al. |
(Continued)

FOREIGN PATENT DOCUMENTS

| CN | 110691418 A | 1/2020 |
| EP | 2732571 B1 | 9/2019 |

OTHER PUBLICATIONS

Samsung Electronics, "Correction to SI Reqeust Procedure", R2-1902609, 3GPP TSG-RAN2 105, Athens, Greece, Feb. 25-Mar. 1, 2019.

*Primary Examiner* — Intekhaab A Siddiquee
(74) *Attorney, Agent, or Firm* — ScienBiziP, P.C.

(57)     ABSTRACT

A method performed by a user equipment (UE) for transmitting uplink (UL) data in a radio resource control (RRC)_INACTIVE state is provided. The method includes receiving, from a serving cell, a configuration of at least one UL resource associated with a normal UL (NUL) frequency carrier and a supplementary UL (SUL) frequency carrier of a plurality of UL frequency carriers; selecting one of the NUL frequency carrier or the SUL frequency carrier; initiating a small data transmission (SDT) procedure in the RRC_INACTIVE state to transmit, to the serving cell, at least one UL packet on the selected one of the NUL frequency carrier or the SUL frequency carrier via the at
(Continued)

least one UL resource; and stopping the SDT procedure in a case that at least one predefined condition is fulfilled.

18 Claims, 5 Drawing Sheets

(51) Int. Cl.
  *H04W 74/0833*    (2024.01)
  *H04W 74/0836*    (2024.01)
  *H04W 74/0838*    (2024.01)

(56)                References Cited

U.S. PATENT DOCUMENTS

| | | | |
|---|---|---|---|
| 2019/0254074 A1 * | 8/2019 | Jeon | H04W 36/0085 |
| 2019/0394776 A1 | 12/2019 | Lee et al. | |
| 2020/0015236 A1 | 1/2020 | Kung et al. | |
| 2020/0053799 A1 * | 2/2020 | Jeon | H04L 5/0048 |
| 2023/0319890 A1 * | 10/2023 | Wang | H04W 76/28 |
| | | | 370/329 |

\* cited by examiner

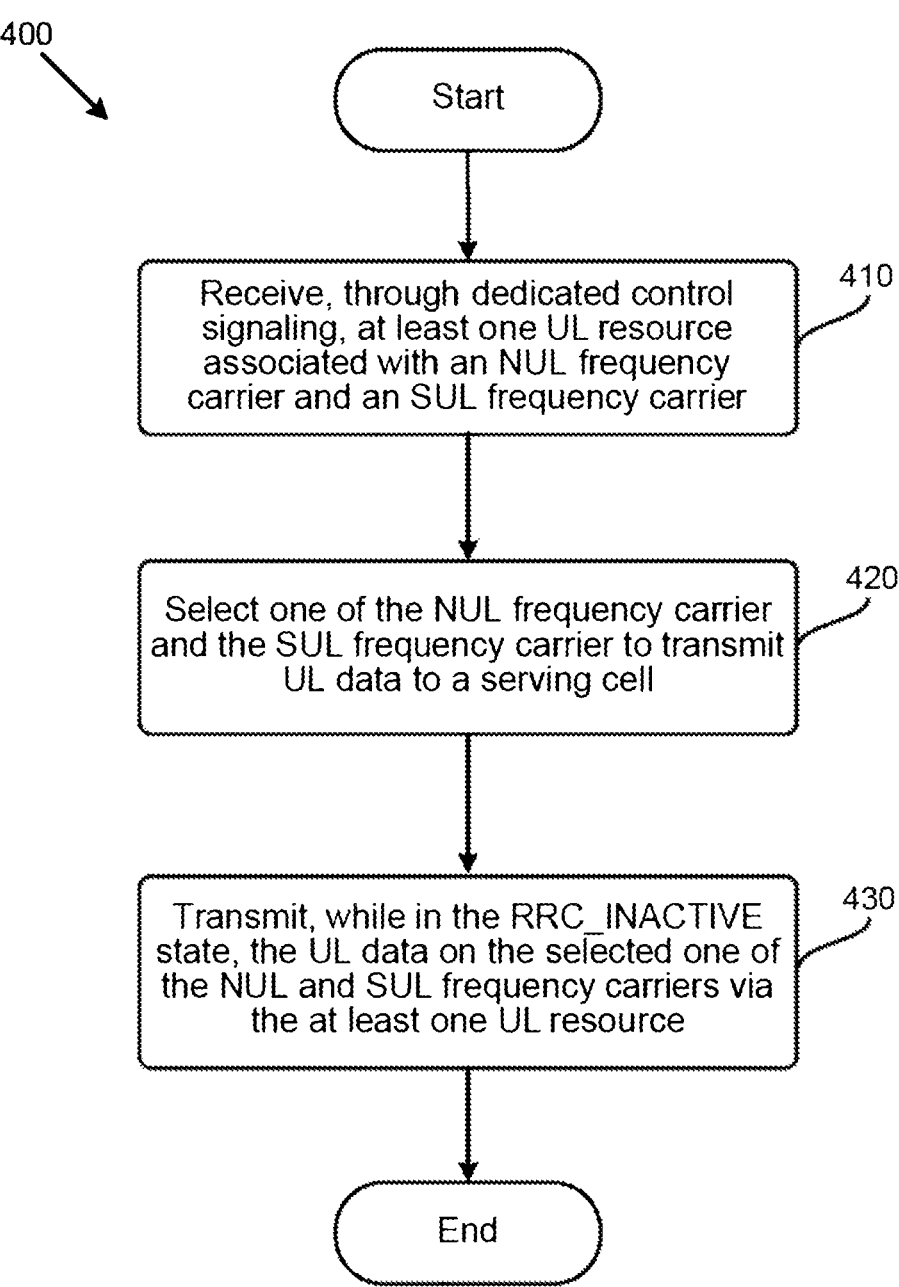

400

Start

Receive, through dedicated control signaling, at least one UL resource associated with an NUL frequency carrier and an SUL frequency carrier

410

Select one of the NUL frequency carrier and the SUL frequency carrier to transmit UL data to a serving cell

420

Transmit, while in the RRC_INACTIVE state, the UL data on the selected one of the NUL and SUL frequency carriers via the at least one UL resource

430

End

FIG. 4

DATA TRANSMISSION MANAGEMENT IN RADIO RESOURCE CONTROL (RRC) INACTIVE STATE

CROSS-REFERENCE TO RELATED APPLICATION(S)

The present application is a National Stage application, filed under 35 U.S.C. § 371, of International Patent Application Serial No. PCT/CN2021/093616, filed on May 13, 2021, which claims the benefit of and priority to U.S. Provisional Patent Application Ser. No. 63/024,409, filed on May 13, 2020. The contents of each of the above-referenced applications are hereby incorporated fully by reference into the present application.

FIELD

The present disclosure generally relates to wireless communications and, more particularly, to management of data transmission by a user equipment (UE) while the UE is in an RRC_INACTIVE state in next-generation wireless networks.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR) system, by improving data rate, latency, reliability, and mobility. The 5G NR system is designed to provide flexibility and configurability to optimize the network services and types, accommodating various use cases, such as enhanced Mobile Broadband (eMBB), massive Machine-Type Communication (mMTC), and Ultra-Reliable and Low-Latency Communication (URLLC).

In NR, a User Equipment (UE) may operate in, and transition between, various Radio Resource Control (RRC) states within a next generation radio access network (RAN). These different states include an RRC Connected state, an RRC Idle state, and a newly added state which is known as an RRC_INACTIVE state. UEs with infrequent (e.g., periodic and/or non-periodic) data transmissions are generally maintained by the network in the RRC_INACTIVE state. A UE in the RRC_INACTIVE state originally was not able to transmit data and had to resume the connection (e.g., move/transition to an RRC_CONNECTED state) for any downlink (DL) data reception and/or uplink (UL) data transmission. Scheduling of resources (and subsequent release of the resources), therefore, had to occur for each data transmission, regardless of how small and infrequent the data packets of each transmission were. This resulted in unnecessary power consumption and signaling overhead.

Signaling overhead due to transmission of small data packets in the UEs that are in an Inactive state can be a general problem that may become a critical issue as the number of UEs increases, not only for the network performance and efficiency, but also for the UE's battery performance. In general, any device that has to transmit intermittent small data packets may benefit from enabling small data transmission in the Inactive state. To enable small data transmission in the Inactive state, the 3rd Generation Partnership Project (3GPP) has recently introduced some mechanisms that utilize, for example, 2-step and/or 4-step random access channel (RACH) procedures and/or configured grant (e.g., Type 1 CG) in the Inactive state. However, further improvements are needed in a small data transmission mechanism while a UE is in an RRC_INACTIVE state.

SUMMARY

The present disclosure is directed to management of data transmission by a user equipment (UE) while the UE is in an RRC_INACTIVE state.

In a first aspect of the present application, a method performed by a user equipment (UE) for transmitting uplink (UL) data in a radio resource control (RRC)_INACTIVE state is provided. The method includes receiving, from a serving cell, a configuration of at least one UL resource associated with a normal UL (NUL) frequency carrier and a supplementary UL (SUL) frequency carrier of a plurality of UL frequency carriers; selecting one of the NUL frequency carrier or the SUL frequency carrier; initiating a small data transmission (SDT) procedure in the RRC_INACTIVE state to transmit, to the serving cell, at least one UL packet on the selected one of the NUL frequency carrier or the SUL frequency carrier via the at least one UL resource; and stopping the SDT procedure in a case that at least one predefined condition is fulfilled.

In an implementation of the first aspect, the at least one predefined condition includes at least one of the following: a cell reselection has occurred; an access stratum (AS) security error has occurred; an indication that a maximum number of retransmissions in a radio link control (RLC) layer has been reached; a random access problem has occurred; or a timing advanced (TA) timer associated with a UL configured grant (CG) for the SDT procedure has expired.

In another implementation of the first aspect, the at least one UL resource includes a CG resource and a random access (RA) resource, and one of the CG resource or the RA resource is associated with the NUL frequency carrier and the other one of the CG resource or the RA resource is associated with the SUL frequency carrier for the UE to transmit the at least one UL packet to the serving cell in the RRC_INACTIVE state.

In another implementation of the first aspect, selecting the one of the NUL frequency carrier or the SUL frequency carrier includes selecting any of the NUL frequency carrier or the SUL frequency carrier with which the CG resource is associated based on the CG resource having a higher priority than the RA resource.

In another implementation of the first aspect, selecting the one of the NUL frequency carrier or the SUL frequency carrier includes selecting any of the NUL frequency carrier or the SUL frequency carrier with which the RA resource is associated in a case that: the CG resource is not available, or the UE receives an indication from the serving cell that indicates to the UE to fallback from the CG resource to the RA resource for UL packet transmission.

In another implementation of the first aspect, the RA resource includes one of a 2-step RA resource and a 4-step RA resource, and the UE selects one of the 2-step RA resource or the 4-step RA resource for UL packet transmission based on a downlink (DL)-reference signal received power (RSRP) threshold associated with a type of the RA resource.

In another implementation of the first aspect, a first DL-RSRP threshold is configured by the serving cell to be associated with the NUL frequency carrier, a second DL-RSRP threshold is configured by the serving cell to be associated with the SUL frequency carrier, and the DL- RSRP threshold associated with the type of the RA resource is further associated with the selected one of the NUL frequency carrier or the SUL frequency carrier based on the first DL-RSRP threshold or the second DL-RSRP threshold.

In another implementation of the first aspect, the at least one UL resource includes a first UL resource and a second UL resource, wherein selecting the one of the NUL frequency carrier or the SUL frequency carrier includes receiving, from the serving cell, through dedicated control signaling, a downlink (DL)-reference signal received power (RSRP) threshold; selecting the one of the NUL frequency carrier or the SUL frequency carrier based on the DL-RSRP threshold; and after selecting the one of the NUL frequency carrier or the SUL frequency carrier, selecting one of the first UL resource or the second UL resource assigned to the selected one of the NUL frequency carrier or the SUL frequency carrier for transmitting the at least one UL packet to the serving cell.

In another implementation of the first aspect, the method further includes, after the at least one UL packet is transmitted to the serving cell using the NUL frequency carrier, determining that the at least one UL packet is to be retransmitted to the serving cell; and retransmitting the at least one UL packet using the NUL frequency carrier without using any other one of the plurality of UL frequency carriers, wherein retransmitting the at least one UL packet includes one of a Hybrid Automatic Repeat Request (HARQ) retransmission or an Automatic Repeat Request (ARQ) retransmission.

In another implementation of the first aspect, the at least one UL packet includes a first packet and a second packet, wherein transmitting the at least one UL packet includes transmitting, to the serving cell, the first UL packet and the second UL packet on the selected one of the NUL frequency carrier or the SUL frequency carrier without using any other one of the plurality of UL frequency carriers for transmitting the second UL packet.

In a second aspect, a UE including at least one processor and one or more non-transitory computer-readable media coupled to the at least one processor and configured to store computer-executable instructions is provided. When executed by the at least one processor, the computer-executable instructions cause the UE to receive, from a serving cell, a configuration of at least one UL resource associated with an NUL frequency carrier and an SUL frequency carrier of a plurality of UL frequency carriers; select one of the NUL frequency carrier or the SUL frequency carrier; initiate an SDT procedure in the RRC_INACTIVE state to transmit, to the serving cell, at least one UL packet on the selected one of the NUL frequency carrier or the SUL frequency carrier via the at least one UL resource; and stop the SDT procedure in a case that at least one predefined condition is fulfilled.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

FIG. 2B is a diagram illustrating an RA procedure with 4-step RA type (e.g., for small data transmission), according to an example implementation of the present application.

FIG. 4 is a flowchart illustrating a method (or process) performed by a UE to transmit uplink (UL) data using at least one of a NUL or a SUL frequency carrier, while the UE is in an RRC_INACTIVE state, according to an example implementation of the present application.

DETAILED DESCRIPTION

Figure 1:
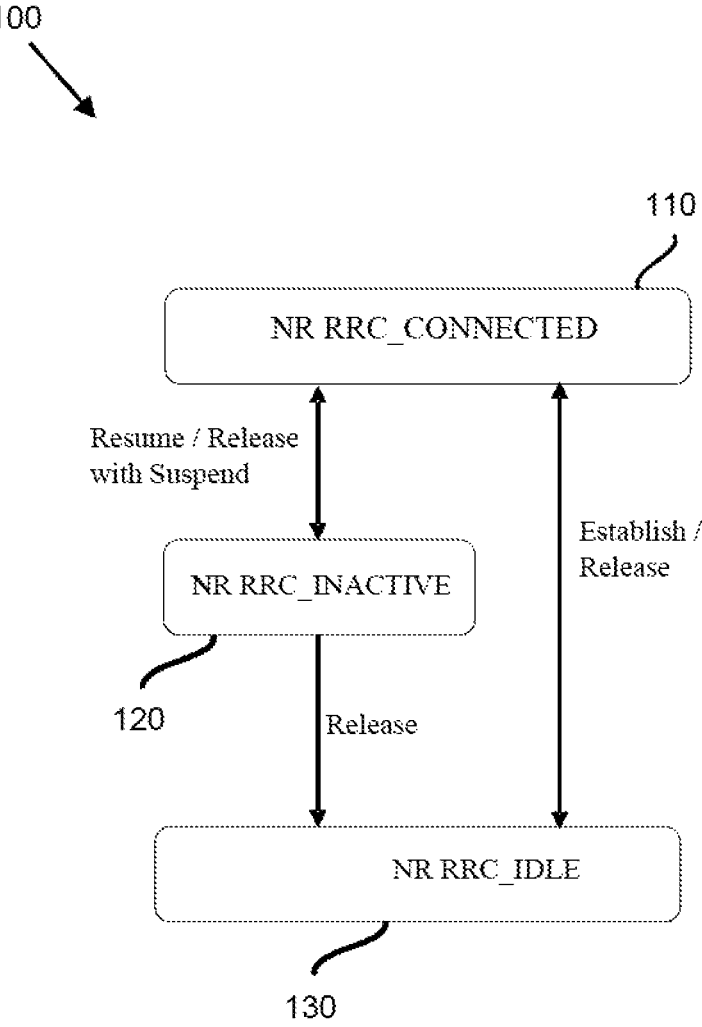
FIG. 1 is a diagram illustrating a UE state machine and the UE's state transitions, according to an example implementation of the present application.

The acronyms in the present application are defined as follows and unless otherwise specified, the acronyms have the following meanings:

| Acronym | Full name |
| --- | --- |
| 3GPP | $3^{rd}$ Generation Partnership Project |
| 5GC | 5G Core |
| ACK | Acknowledgement |
| AMF | Access and Mobility Management Function |
| ARQ | Automatic Repeat Request |
| AS | Access Stratum |
| BCCH | Broadcast Control Channel |
| BCH | Broadcast Channel |
| BFR | Beam Failure Recovery |
| BS | Base Station |
| BSR | Buffer Status Report |
| BWP | Bandwidth Part |
| CA | Carrier Aggregation |
| CBRA | Contention Based Random Access |
| CFRA | Contention Free Random Access |
| CG | Configured Grant |
| CM | Connection Management |
| CN | Core Network |
| C-RNTI | Cell Radio Network Temporary Identifier |
| CS-RNTI | Configured Scheduling Radio Network Temporary Identifier |
| CSI-RS | Channel State Information Reference Signal |
| DCI | Downlink Control Information |
| DL | Downlink |
| DRB | Data Radio Bearer |
| DRX | Discontinuous Reception |
| HARQ | Hybrid Automatic Repeat Request |
| IE | Information Element |
| LCH | Logical Channel |
| LCG | Logical Channel Group |
| LCP | Logical Channel Prioritization |
| MAC | Medium Access Control |
| MIB | Master Information Block |
| MSG | Message |
| NAS | Non-Access Stratum |
| NG-RAN | Next-Generation Radio Access Network |
| NR | New Radio |
| NW | Network |
| PCell | Primary Cell |
| PCCH | Paging Control Channel |
| PDCCH | Physical Downlink Control Channel |
| PDCP | Packet Data Convergence Protocol |
| PDU | Protocol Data Unit |
| PRACH | Physical Random Access Channel |
| PUCCH | Physical Uplink Control Channel |

-continued

| Acronym | Full name |
| --- | --- |
| PUSCH | Physical Uplink Shared Channel |
| PLMN | Public Land Mobile Network |
| QoS | Quality of Service |
| RA | Random Access |
| RACH | Random Access Channel |
| RAN | Radio Access Network |
| RB | Radio Bearer |
| Rel | Release |
| RLC | Radio Link Control |
| RNA | RAN-based Notification Area |
| RNTI | Radio Network Temporary Identifier |
| RRC | Radio Resource Control |
| RSRP | Reference Signal Receiving Power |
| SCell | Secondary Cell |
| SCG | Secondary Cell Group |
| SCS | Sub Carrier Spacing |
| SDT | Small Data Transmission |
| SDU | Service Data Unit |
| SFN | System Frame Number |
| SI | System Information |
| SIB | System Information Block |
| SINR | Signal to Interference plus Noise Ratio |
| SLIV | Start and Length Indicator |
| SNPN | Stand-alone Non-Public Network |
| SR | Scheduling Request |
| SRB | Signaling Radio Bearer |
| SSB | Synchronization Signal Block |
| S-TMSI | SAE-Temporary Mobile Subscriber Identity |
| SUL | Supplementary Uplink |
| TA | Timing Advance or Time Alignment |
| TAG | Timing Advance Group |
| TS | Technical Specification |
| UE | User Equipment |
| UE | Uplink |
| UPF | User Plane Function |

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series, and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software, or a combination of software and hardware. Described functions may correspond to modules which may be software, hardware, firmware, or any combination thereof. The software implementation may comprise computer-executable instructions stored on computer-readable medium, such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Application-Specific Integrated Circuits (ASICs), programmable logic arrays, and/or one or more Digital Signal Processor (DSPs). Although some of the example implementations described in this specification are oriented to software installed and executing on computer hardware, nevertheless, alternative example implementations implemented as firmware, as hardware, or as a combination of hardware and software are well within the scope of the present disclosure.

The computer-readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A base station may include, but is not limited to, a node B (NB) as in the UNITS, an evolved node B (eNB) as in the LTE or LTE-A, a radio network controller (RNC) as in the UNITS, a base station controller (BSC) as in the GSM/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

The base station may be operable to provide radio coverage to a specific geographical area using a plurality of cells included in the RAN. The BS may support the operations of the cells. Each cell may be operable to provide services to at least one UE within its radio coverage. Specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The BS may communicate with one or more UEs in the radio communication system through the plurality of cells.

A cell may allocate sidelink (SL) resources for supporting Proximity Service (ProSe) or Vehicle to Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate, and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP), may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, and the UL transmission data should also be configurable, for example, based on the network dynamics of NR. In addition, sidelink resources may also be provided in an NR frame to support ProSe services or V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, an MN may be formed by a Master Cell Group (MCG), and an SN may be formed by a Secondary Cell Group (SCG). In other words, for a UE configured with dual connectivity (DC), the MCG is a set of one or more serving cells including the PCell and zero or more secondary cells. Conversely, the SCG is a set of one or more serving cells including the PSCell and zero or more secondary cells.

As also described above, the Primary Cell (PCell) may be an MCG cell that operates on the primary frequency, in which the UE either performs the initial connection establishment procedure or initiates the connection reestablishment procedure. In the MR-DC mode, the PCell may belong to the MN. The Primary SCG Cell (PSCell) may be an SCG cell in which the UE performs random access (e.g., when performing the reconfiguration with a sync procedure). In MR-DC, the PSCell may belong to the SN. A Special Cell (SpCell) may be referred to a PCell of the MCG, or a PSCell of the SCG, depending on whether the Medium Access Control (MAC) entity is associated with the MCG or the SCG. Otherwise, the term Special Cell may refer to the PCell. A Special Cell may support a Physical Uplink Control Channel (PUCCH) transmission and contention-based Random Access, and may always be activated. Additionally, for a UE in an RRC_CONNECTED state that is not configured with the CA/DC, may communicate with only one serving cell (SCell) which may be the primary cell. Conversely, for a UE in the RRC_CONNECTED state that is configured with the CA/DC, a set of serving cells including the special cell(s) and all of the secondary cells may communicate with the UE.

As described above, in NR, three different RRC states are supported as different modes of operations for a UE. These three states include an RRC_CONNECTED state, an RRC_IDLE state, and an RRC_INACTIVE state. A UE (or the RRC layer of the UE) may operate in one of these three RRC states. Except for a UL data transmission that is performed during an RA procedure, the UL data transmission may generally be allowed to be performed by the UE only in the RRC_CONNECTED state.

FIG. 1 is an RRC state transition diagram illustrating various RRC states and RRC transition procedures that a UE may undergo within a next generation radio access network, according to an exemplary implementation of the present application. The RRC state transition diagram 100 may include RRC_CONNECTED state 110, RRC_INACTIVE state 120, and RRC_IDLE state 130. In some implementations, the RRC_CONNECTED, RRC_INACTIVE, and RRC_IDLE states may be three RRC states independent of one another. As shown in FIG. 1, a UE may transition among the three RRC states.

For example, a UE may transition to RRC_INACTIVE state 120 from RRC_CONNECTED state 110 or may transition from RRC_INACTIVE state 120 to any of RRC_CO-NNECTED state 110 or RRC_IDLE state 130. However, as shown in RRC state transition diagram 100, a UE may not transition directly from RRC_IDLE state 130 to RRC_I-NACTIVE state 120 in some implementations. That is, a UE may transition to RRC_INACTIVE state 120 from RRC_IDLE state 130 through RRC_CONNECTED state 110 in some such implementations. In some aspects of the present implementations, a UE may also transition from RRC_CONNECTED state 110 to RRC_INACTIVE state 120 using an RRC Suspend (or RRC Release with Suspend) procedure. Conversely, the UE may transition from RRC_I-NACTIVE state 120 to RRC_CONNECTED state 110 using an RRC (Connection) Resume procedure. Additionally, the UE may use an RRC Release procedure to transition from RRC_CONNECTED state 110 or RRC_INACTIVE state 120 to RRC_IDLE state 130, while using an RRC Establish procedure to transition from RRC_IDLE state 130 to RRC_CONNECTED state 110.

In some implementations, in an RRC_INACTIVE state, a UE may remain as Connection Management (CM)-CON-NECTED (e.g., where the UE has a signaling connection with AMF) and may move within an area configured by the NG-RAN (e.g., RNA) without notifying the NG-RAN. In the RRC_INACTIVE state, the last serving cell (e.g., associated with a gNB) may keep the UE context and the UE-associated NG connection with the serving AMF and UPF.

In some implementations, the RRC_INACTIVE state may support various functions and/or characteristics, such as small data transmission (SDT), PLMN selection, SNPN selection, broadcast of system information, cell re-selection mobility, paging initiated by NG-RAN (RAN paging), RAN-based notification area (RNA) managed by NG-RAN, DRX for RAN paging configured by NG-RAN, 5GC-NG-RAN connection (e.g., both control/user (C/U)-planes) established for the UE, UE AS context stored in NG-RAN and the UE, NG-RAN determining the RNA to which the UE belongs, etc. In some implementations, for NR connected to a 5GC network, a UE's identity (e.g., I-RNTI) may be used to identify the UE context in the RRC_INACTIVE state. The I-RNTI may provide the new NG-RAN node with a reference to the UE context corresponding to the old NG-RAN node.

How the new NG-RAN node is able to resolve the old NG-RAN ID from the I-RNTI is a matter of proper configuration in the old and new NG-RAN nodes. Some typical partitioning of a 40-bit I-RNTI my include, but is not limited to, a UE-specific reference, an NG-RAN node address index, PLMN-specific information, and SNPN-specific information. A UE-specific reference may include a reference to the UE context within a logical NG-RAN node. An NG-RAN node address index may include information that identifies the NG-RAN node that allocates the UE specific part. Network-specific information (e.g., PLMN-specific information or SNPN-specific information) may include information that supports network sharing deployments, and provides an index to the PLMN ID part of the Global NG-RAN node identifier. SNPN may include a small PLMN that is configured by an operator. Each SNPN may be identified by a unique SNPN identity (ID) (e.g., an identifier for an SNPN may be a combination of a PLMN ID and an MD). A configured grant configuration may be associated with an SNPN ID.

In some implementations, the AS Context for a UE in RRC_INACTIVE state may be stored when the connection is suspended (e.g., when the UE is in an RRC_INACTIVE state) and may be restored/retrieved when the connection is resumed (e.g., when the UE transitions from the RRC_I-NACTIVE state to an RRC_CONNECTED state). The suspension of the RRC connection may be initiated by the network. When the RRC connection is suspended, the UE may store the UE Inactive AS context (and any related configuration received from the network), and may transition to an RRC_INACTIVE state. If the UE is configured with SCG, the UE may release/suspend the SCG configuration upon initiating an RRC Connection Resume procedure. The RRC message to suspend the RRC connection may be integrity-protected and ciphered. Resumption from a suspended RRC connection may be initiated by upper layers when the UE needs to transition from an RRC_I-NACTIVE state to an RRC_CONNECTED state, or by the RRC layer to perform an RNA update, or by RAN paging, for example, from NG-RAN. When the RRC connection is resumed, the network may configure the UE according to the RRC connection resume procedure and based on the stored UE Inactive AS context (and any related RRC configuration received from the network). The RRC connection resume procedure may reactivate the AS security and reestablish the SRB(s) and DRB(s).

In some implementations, in response to a request to resume an RRC connection, the network may perform any of the following procedures. In some implementations, in response to such a request, the network may resume the suspended RRC connection and send the UE to an RRC_CONNECTED state, or may reject the request and send the UE to an RRC_INACTIVE state (e.g., with a wait timer). In some other implementations, the network may directly re-suspend the RRC connection in response to the request and send the UE to an RRC_INACTIVE state, or may directly release the (RRC) connection and send the UE to an RRC_IDLE mode. In yet other implementations, in response to a request to resume the RRC connection, the network may instruct the UE to initiate a NAS-level recovery (e.g., by sending an RRC setup message to the UE).

In addition, in the RRC_INACTIVE state, the upper layers (or the RRC layer) may configure a UE's specific DRX mechanism. The UE's controlled mobility may be based on the network configuration in the RRC_INACTIVE state, and the UE may store the UE Inactive AS context. Additionally, a RAN-based notification area may be configured by the RRC layer when the UE is in the RRC_INAC-TIVE state. Furthermore, the UE may perform other functions while in the RRC_INACTIVE state, such as monitoring Short Messages (e.g., that are transmitted with P-RNTI over DCI); monitoring a Paging channel for CN paging (e.g., using 5G-S-TMSI) and RAN paging (e.g., using full I-RNTI); performing neighboring cell measurements and cell (re-)selection; performing RAN-based notification area updates periodically and/or when moving outside the configured RAN-based notification area; and acquiring system information and sending an SI request (e.g., if configured).

Random Access Procedure

In some implementations, two types of random access (RA) procedures may be supported/configured for the UE. For example, 4-step RA type with MSG 1 and 2-step RA type with MSG A. Both types of RA procedure support contention-based random access (CBRA) and contention-free random access (CFRA).

The UE selects the type of random access at initiation of the random access procedure based on the network configuration, for example, as follows:

when CFRA resources are not configured, an RSRP threshold may be used by the UE to select between 2-step RA type and 4-step RA type;

when CFRA resources for 4-step RA type are configured, UE may perform RA with 4-step RA type; and/or when CFRA resources for 2-step RA type are configured, UE may perform RA with 2-step RA type.

Figure 2A:
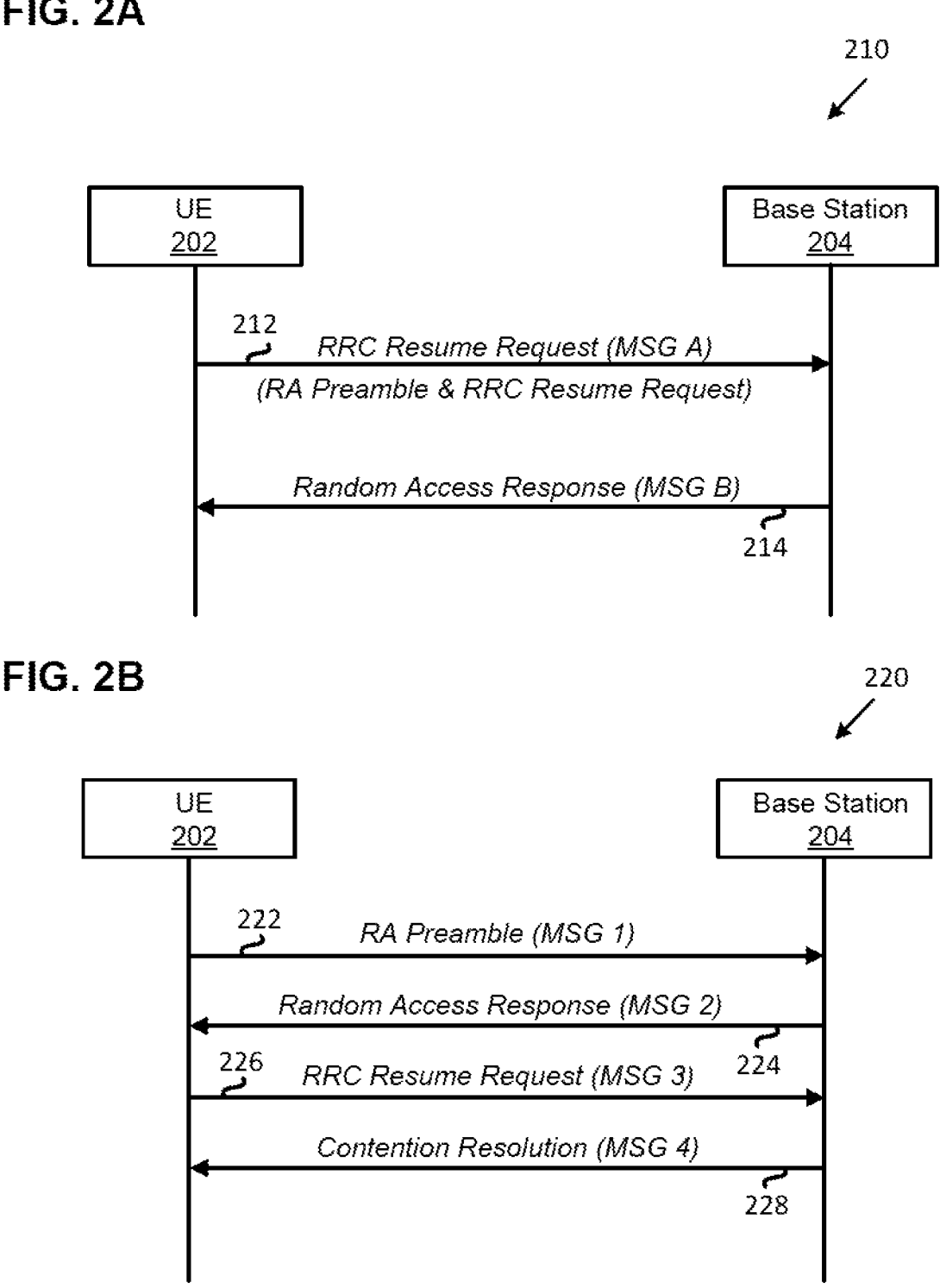
FIG. 2A is a diagram illustrating a random access (RA) procedure with 2-step RA type (e.g., for small data transmission), according to an example implementation of the present application.

FIG. 2A is a diagram 210 illustrating a random access procedure with 2-step RA type (e.g., for small data transmission), according to an example implementation of the present application. Diagram 210 includes UE 202 and base station 204 (e.g., a gNB), where UE 202 may transmit an RRC resume request and/or uplink (UL) data (e.g., small data) to base station 204 via a random access procedure with 2-step RA type.

As illustrated in FIG. 2A, action 212 includes UE 202 transmitting a random access (RA) preamble and/or an RRC resume request (e.g., MSG A) to base station 204. MSG A may include a RACH resource and a PUSCH payload. The RA preamble may be transmitted via the RACH resource of MSG A. The RRC resume request may be transmitted via the PUSCH payload of MSG A. Base station 204 may configure the RACH resources which may be used to let UE 202 transmit the RA preamble. In some implementations, the RACH resources may be configured specifically for the small data transmission purpose. UE 202 may select a RACH resource (for a small data transmission purpose) from the configured RACH resources (e.g., prescribed by combinations of time resources, frequency resources, and sequence resources). Then, UE 202 may transmit the RA preamble using the selected RACH resource of MSG A, e.g., for the purpose of small data transmission. UE 202 may transmit the RRC resume request via the PUSCH payload of MSG A. The UL data (e.g., small data) may also be multiplexed with the RRC resume request to be transmitted via the PUSCH payload of MSG A.

As illustrated in FIG. 2A, action 214 includes base station 204 transmitting a random access response (RAR) (e.g., MSG B) to UE 202, for example, when base station 204 detects the RA preamble and/or the UL data). For UL data transmission (e.g., small data transmission), base station 204 may provide an acknowledge (ACK)/non-acknowledgement (NACK) message in MSG B to indicate to UE 202 whether base station 204 has received the UL data in MSG A successfully or not. In some additional implementations, the serving base station 204 may transmit one RRCRelease message in action 214 (e.g., via the Random Access Response message (MSG B) delivery) to finish the small data transmission procedure. In contrast, in some implementations, the serving base station 204 may transmit another UL grant in the Action 214 for the UE to transmit following (at least one) pending UL packets (and so the small data transmission procedure may be continued after Action 214). In some other implementations, the serving base station 204 may also transmit (at least) one DL packet in action 214 with/without additional UL grant (and so the small data transmission procedure may be continued after action 214). Finally, after the subsequent DL/UL packet exchange after action 214, the serving base station may transmit one RRCRelease message with/without suspend configuration to finish the small data transmission.

FIG. 2B is a diagram 220 illustrating a random access procedure with 4-step RA type (e.g., for small data transmission), according to an example implementation of the present application. Diagram 220 includes UE 202 and base station 204 (e.g., a gNB), where UE 202 may transmit an RRC resume request and/or UL data (e.g., small data) to base station 204 via a random access procedure with 4-step RA type.

As illustrated in FIG. 2B, action 222 includes UE 202 transmitting an RA preamble (e.g., MSG 1) to base station 204. Base station 204 may configure RACH resources which may be used to let UE 202 transmit the RA preamble. In some implementations, the RACH resources may be configured specifically for small data transmission purpose. In some implementations, UE 202 may select a RACH resource (for small data transmission purpose) from the configured RACH resources (e.g., prescribed by combinations of time resources, frequency resources, and sequence resources). Then, UE 202 may transmit the RA preamble using the selected RACH resource, e.g., for small data transmission purpose.

Action 224 includes base station 204 transmitting a RAR (e.g., MSG 2) to UE 202, for example, when base station 204 detects the RA preamble. The RAR (MSG 2) may be transmitted over the entire cell covered by base station 204, since base station 204 may not have been able to identify UE 202 that transmitted the RA preamble. For example, a physical downlink shared channel (PDSCH) resource in which the RAR is mapped may be indicated by base station 204 to UE 202 via a physical downlink control channel (PDCCH). Also, the RAR may contain information relating to a resource to be used by UE 202 in uplink or information relating to uplink transmission timing for UE 202 to transmit the following MSG 3.

Action 226 includes UE 202 transmitting an RRC resume request (e.g., MSG 3) using the uplink resource (e.g., PDSCH resource) provided by base station 204 via the RAR in action 224. In some of the present implementations, UE 202 may transmit an RRC Resume Request message to base station 204, where the RRC Resume Request message may or may not be requesting for transitioning to an RRC_CONNECTED state. In some implementations, the UL data (e.g., small data) may also be multiplexed with the RRC Resume Request message to be transmitted via MSG 3.

Action 228 includes base station 204 transmitting a PDCCH transmission for contention resolution (e.g., MSG 4) to UE 202. In some of the present implementations, base station 204 may provide an acknowledge (ACK)/non-acknowledgement (NACK) message in MSG 4 to indicate to UE 202 whether base station 204 has received the UL data in MSG 3 successfully or not. In some additional implementations, the serving base station 204 may transmit one RRCRelease message in action 228 (e.g., via the MSG 4 delivery) to finish the small data transmission procedure. In contrast, in some implementations, the serving base station 204 may transmit another UL grant in action 228 for the UE to transmit following (at least) one pending UL packet(s) (and so the small data transmission procedure may be continued after action 228). In some other implementations, the serving base station 204 may also transmit (at least) one pending DL packet in action 228 with/without additional UL grant (and so the small data transmission procedure may be continued after action 228). Finally, after the subsequent DL/UL packet exchange after action 228, the serving base station may transmit one RRCRelease message with/without suspend configuration to finish the small data transmission. In some implementations, MSG A of the RA procedure with 2-step RA type may include a preamble on PRACH and a payload on PUSCH. In some such implementations, after the MSG A transmission, the UE may monitor for a response from the network within a configured window. For the CFRA, upon receiving the network response (e.g., RRCRelease message), the UE may end the random access procedure (or the small packet transmission procedure). For CBRA, if contention resolution is successful, for example, upon receiving the network response, the UE may end the random access procedure. If a fallback indication is received in MSG B, the UE may perform the MSG 3 transmission and monitor contention resolution. If contention resolution is not successful after MSG 3 (re)transmission(s), the UE may go back to the MSG A transmission. In some implementations, if the random access procedure with 2-step RA type is not completed after a number of MSG A transmissions, the UE may be configured to switch to CBRA with a 4-step RA type for (Uplink) small packet transmission.

For random access in a cell configured with SUL, the network may explicitly signal which carrier may be used (e.g., NUL or SUL carrier); otherwise, the UE may select the SUL carrier if the measured quality of the DL (e.g., Downlink Reference Signal Received Power, DL-RSRP) is lower than a broadcast threshold (e.g., a DL-RSRP threshold with unit in decibel milliwatt (dBm)). The UE may perform a carrier selection before selecting between the RA procedure with 2-step or 4-step RA type. The RSRP threshold for selecting between the 2-step and 4-step RA types may be configured separately for NUL and SUL. Once started, all uplink transmissions of the random access procedure may remain on the selected carrier.

In some implementations, the network may not configure CFRA resources for both 4-step and 2-step RA types at the same time for a Bandwidth Part (BWP) (e.g., one Uplink BandwidthPart). CFRA with 2-step RA type may only be supported in a handover scenario or in a conditional handover procedure. Additionally, when CA is configured, in some implementations, a random access procedure with 2-step RA type may only be performed on a PCell (which may or may not be the serving cell to the UE after the UE moving to RRC_INACTIVE state), as long as the PCell is capable of cross-scheduling a contention resolution. In some implementations, when CA is configured, for a random access procedure with 4-step RA type, the first three steps of the CBRA may always occur on the PCell, as long as the PCell is capable of cross-scheduling the contention resolution (step 4). The three steps of a CFRA started on the PCell may remain on the PCell. Conversely, a CFRA on an SCell may only be initiated by the base station (e.g., a gNB) to establish timing advance for a secondary TAG. That is, the procedure may be initiated by the based station with a PDCCH order (step 0) that is sent on a scheduling cell of an activated SCell of the secondary TAG; the preamble transmission (step 1) may take place on the indicated SCell; and a random access response (step 2) may take place on the PCell.

Configured Grant

In some implementations, in the uplink, a base station (e.g., a gNB) may dynamically allocate resources to the UEs, for example, via the C-RNTI/CS-RNTI on PDCCH(s). A UE may monitor the PDCCH(s) in order to find possible configured grants for the uplink transmission when its downlink reception is enabled (e.g., the UE may have DL activity governed by DRX when DRX is configured). When CA is configured, the same C-RNTI/CS-RNTI may apply to all serving cells. In addition, with Configured Grants, the base station may allocate the uplink resources for the initial HARQ transmissions to the UEs.

In some implementations, two types of configured uplink grants may be configured. With Type 1 configured grant (CG), the RRC signaling may directly provide the configured uplink grant (e.g., including the periodicity). With Type 2 CG, the RRC signaling may define the periodicity of the configured uplink grant, while the PDCCH addressed to the CS-RNTI may either signal and activate the configured uplink grant, or deactivate it. That is, a PDCCH addressed to the CS-RNTI may indicate that the uplink grant can be implicitly reused according to the periodicity defined by the RRC signaling, until deactivated.

Type 1 and Type 2 CGs are configured by the RRC signaling per Serving Cell and per BWP in some implementations. In some such implementations, multiple configurations may be active simultaneously, e.g., on different Serving Cells. For Type 2 CG, activation and deactivation may depend on the Serving Cells. For the same Serving Cell, the UE/MAC entity may be configured with either Type 1 or Type 2.

In some implementations, RRC may configure different parameters when the configured grant Type 1 is configured. For example, RRC may configure a cs-RNTI parameter used for retransmission; a periodicity parameter that indicates a periodicity of the configured grant Type 1; a timeDomainOffset parameter that indicates the Offset for a resource with respect to SFN=0 in time domain; a timeDomainAllocation parameter for the allocation of configured uplink grant in time domain, which may contain startSymbolAndLength (e.g., SLIV in Technical Specification 38.214); and a nrof-HARQ-Processes parameter that indicates the number of HARQ processes for the configured grant.

Upon configuration of a configured grant Type 1 for a Serving Cell (e.g., by the upper layers), the UE/MAC entity may store the uplink grant provided by the upper layers, as a configured uplink grant for the indicated Serving Cell. The UE/MAC entity may also initialize or re-initialize the configured uplink grant to start in a symbol according to the timeDomainOffset and S (derived from SLIV as specified in Technical Specification (TS) 38.214) parameters, and to reoccur with periodicity.

As described above, in NR, small UL data transmission (SDT) in an RRC_INACTIVE state may be possible. The solution for small data transmission in the RRC_INACTIVE state may be service-agnostic, resulting in different service requirements. In some implementations, small data transmission may be implemented by using a RACH-based mechanism (e.g., through an RA procedure with 2-step and/or 4-step RA type) and/or using pre-configured PUSCH resources (e.g., the configured grant type 1).

The UE AS context (e.g., UE Inactive AS Context) used for the uplink data transmission in an RRC_INACTIVE state may be similar to the one used in a state transition from an RRC_INACTIVE state to an RRC_CONNECTED state. The UE AS context may be located and identified in the network via an "AS Context ID," which may be allocated by the network and stored in the UE (e.g., as well as in the network) when the UE transitions to the RRC_INACTIVE state and may be used to locate the AS context when the UE tries to transmit small data and/or to perform a transition to the RRC_CONNECTED state. The UE AS Context may be stored in an "anchor"/source base station and may be fetched by the new serving base station when needed, for example, upon the triggering a small data transmission and/or transitioning from the RRC_INACTIVE to RRC_CONNECTED state. The UE ID may be able to uniquely identify the UE context in the RAN.

Small data transmission may use the AS Context ID transmitted in the "first" message for contention resolution (e.g., at least when RACH is used). After the "first" message with small data is received, the network may be able to inform the UE that it may move to an RRC_CONNECTED state, for example, via a DL RRC message (e.g., RRCCo-nnectionResume message). The "first" message with small data may provide information to enable the network to apply overload control and prioritization, if needed. The UE may provide the network, in the "first" message with the initial uplink data transmission, all necessary information to enable the network to move the UE to the RRC_CONNECTED state, or to enable the network to let the UE remain in the RRC_INACTIVE state. For example, the information may include a Buffer Status Report (which may be a short (truncated) BSR or a long BSR).

Small data transmission may support at least RLC ARQ mechanisms in some implementations. The network may have the ability to perform a (UE) context update when the UE sends small data in RRC_INACTIVE state. That context update may rely on RRC signaling and may be done in the "second" message (e.g., RRCConnectionResume message or a control response message triggered by the small data transmission). The UE context in the RRC_INACTIVE state may include the configuration of radio bearers (e.g., the radio bearers which are configured/enabled to initiate the small data transmission procedure, which may include any combinations of data radio bearers (DRBs) and/or Signaling Radio Bearers (SRBs, e.g., SRB0/SRB1/SRB2)), logical channels (e.g., the logical channels which are configured/enabled to initiate the small data transmission procedure), security, etc. The UE may maintain the same PDCP entity as in the RRC_CONNECTED state and maintain the PDCP COUNT and the SN of the PDCP entity. The UE may also maintain the same SDAP entity as in the RRC_CON-NECTED state.

One or more specific RBs (e.g., DRBs and/or SRBs) may be maintained/activated in the RRC_INACTIVE state, and small data transmission may take place on a DRB(s) and/or an SRB(s) associated with the concerned service(s). For small data transmission in the RRC_INACTIVE state, the UE may perform small data transmission for the configured RBs (e.g., DRBs and/or SRBs which are configured/acti-vated for small data transmission). If bearers with configured QoS are allowed to be used for UL small data transmission, the QoS may be still required to be met. Please also note, for the active radio bearers/logical channels which are not enabled/configured to initiate small data transmission pro-cedure, the UE may suspend these radio bearers/logical channels as part of the UE Inactive AS context after the UE moves to RRC_INACTIVE state (and so the pending (UL) packets associated with these suspended logical channel/ radio bearers may not be able to initiate a small data transmission procedure).

In some implementations, an RRC resume request may contain at least the required information for the network to perform a contention resolution procedure, identify the UE (Inactive) AS context, and verify the right UE. Upon receiv-ing a response from the network (e.g., a RRC (Connection) Resume message), the UE may be able to identify the right network, perform a contention resolution procedure, and receive DL data and either remain in the RRC_INACTIVE state or resume its previously suspended connection (e.g., to move to the RRC_CONNECTED state). DL transmissions/responses and subsequent UL transmissions may be sup-ported without the UE having to move to the RRC_CON-NECTED state.

HARQ ACK/NACK transmissions may be supported when a MSG 3 is transmitted (e.g., the UE is expected to continuously monitor the DL PDCCH once it sends the first UL packet, and DL RLC (e.g., Automatic Repeat-reQuest) ACK/NACK messages may be scheduled normally when a UE still listens to the DL channels in the following DL/UL packet exchange during the small data transmission proce-dure). The UE may provide the network with information to enable the network to decide whether to leave the UE in the RRC_INACTIVE state or move the UE to the RRC_CON-NECTED state.

In some implementations, MSG 1 may be used for RA preamble transmission of the random access procedure with 4-step RA type; MSG 3 may be used for first scheduled transmission of the random access procedure; MSG A may be used for RA preamble and PUSCH payload transmissions of the random access procedure with 2-step RA type; and MSG B may be used for responding to MSG A in the random access procedure with 2-step RA type. In some aspects of the present implementations, MSG B may include one or more responses for contention resolution, fallback indication(s), and/or backoff indication (e.g., to instruct the UE to re-initiate an SDT procedure or a non-SDT procedure after a backoff time interval).

As described above, in some implementations, a UE may be configured to transmit UL data (e.g., UL packets) while the UE is in an RRC_INACTIVE state. In some such implementations, the RRC_INACTIVE UE may transmit the UL data on an NUL carrier and/or an SUL carrier using UL configured grant and/or random access resources.

Figures 3A, 3B:
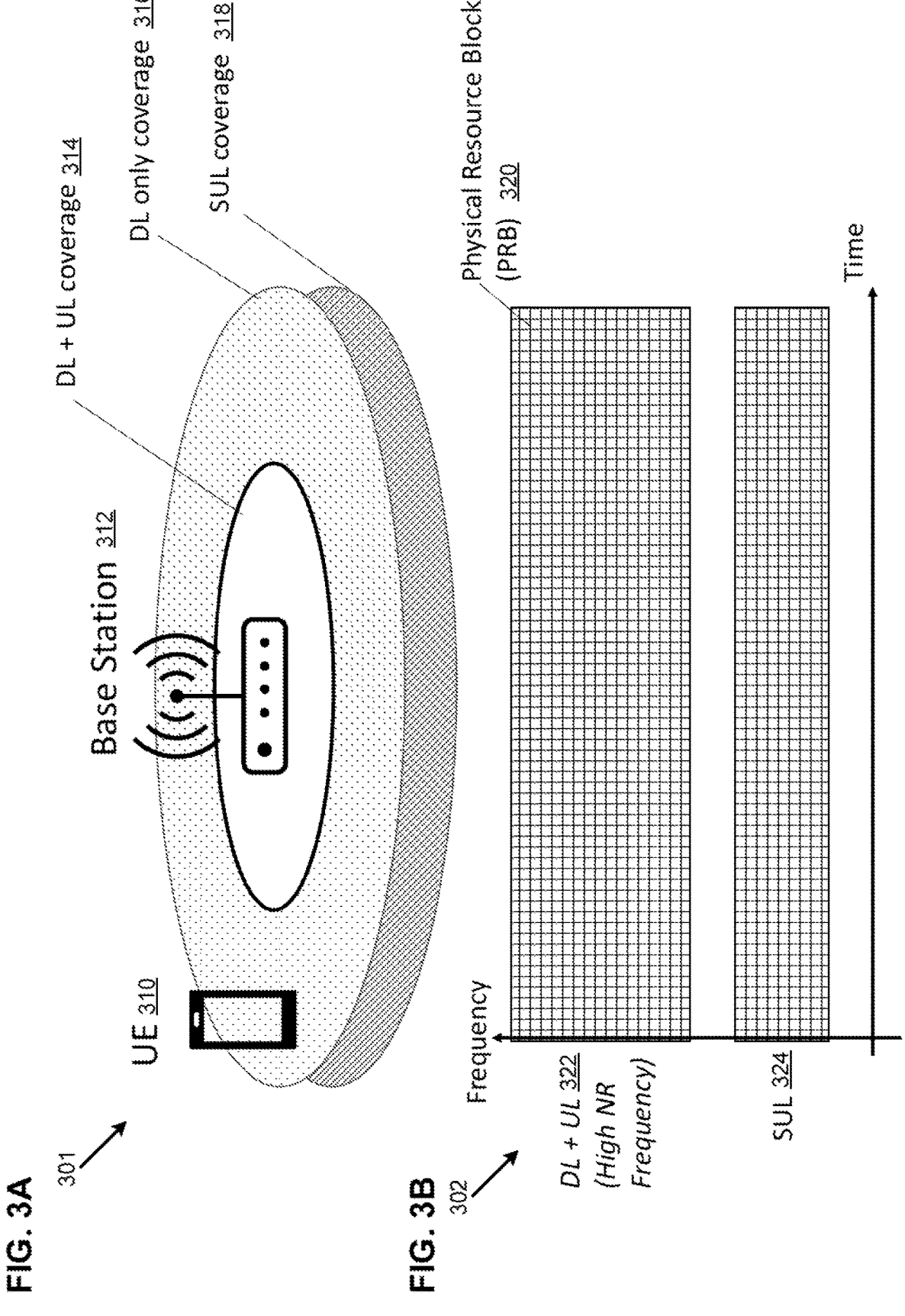
FIG. 3A is a diagram illustrating different coverage areas for a UE that is configured with a supplementary uplink (SUL) frequency carrier in addition to the normal uplink (NUL) frequency carrier, according to an example implementation of the present application.
FIG. 3B is a time-frequency resource grid illustrating physical resource blocks allocated to SUL and NUL frequency carriers, according to an example implementation of the present application.

FIGS. 3A-3B illustrate examples of NUL and SUL fre-quency carrier coverage areas, as well as physical resource blocks allocated to SUL and NUL frequency carriers. Spe-cifically, FIG. 3A is a diagram 301 illustrating different coverage areas for a UE that is configured with a supple-mentary uplink (SUL) frequency carrier in addition to the normal uplink (NUL) frequency carrier, according to an example implementation of the present application.

As shown, FIG. 3A includes a base station 312 (e.g., a gNB or an eNB) having three different service coverage areas and a UE 310 located within one or more of these coverage areas. More specifically, base station 312 is asso-ciated with a DL and UP coverage area 314, a DL only coverage area 316, and an SUL coverage area 318. As illustrated, DL and UP coverage area 314 covers a smaller area than DL only coverage area 316 and a SUL coverage area 318.

In some implementations, in conjunction with a UL/DL carrier pair (Frequency Division Duplexing band) or a bidirectional carrier (Time Division Duplexing band), a UE may be configured with additional, Supplementary Uplink (SUL) frequency carrier(s). A SUL carrier may be different from an aggregated uplink in that the UE may be scheduled to transmit either on the supplementary uplink or on the uplink of the carrier being supplemented, but may not be able to transmit on both carriers at the same time.

In case of a Supplementary Uplink (SUL, see 3GPP TS 38.101-1 [18]), a UE may be configured with 2 ULs for one DL of the same cell, and the uplink transmissions on those two ULs may be controlled by the network to avoid over-lapping Physical Uplink Shared Channel (PUSCH)/Physical Uplink Control Channel (PUCCH) transmissions, for example, in the time domain. Overlapping transmissions on the PUSCH may be avoided through scheduling, while overlapping transmissions on the PUCCH may be avoided through configuration (e.g., a PUCCH configuration may only be configured for only one of the two ULs of the cell). In some implementations, the initial access may be supported in each of the uplinks.

As shown in FIG. 3A, UE 310 is located within DL only coverage area 316 as well as SUL coverage area 318. As such, UE 310 may only be able to transmit UL data, while the UE is in an RRC_INACTIVE state, using the SUL frequency carrier (e.g., if UL resources, as described in detail below, for such a purpose are configured to the UE).

FIG. 3B is a time-frequency resource grid 302 illustrating physical resource blocks 320 allocated to SUL and NUL frequency carriers, according to an example implementation of the present application. Specifically, FIG. 3B illustrates two component carriers configured (e.g., with multiple BWPs) on a time-frequency grid 302. As shown in the figure, in some implementations, DL and UL component carrier 322 corresponding to coverage area 314 (shown in FIG. 3A) is associated with higher frequency bands on the time-frequency grid 302, while SUL component carrier 324 corresponding to coverage area 318 (shown in FIG. 3A) is associated with relatively lower frequency bands (e.g., compared to DL and UL component carrier 322) on the time-frequency grid 302.

Small Data Transmission Using Dedicated RA Resources

In some implementations, the UE may be configured with dedicated random access resource(s) for small data/packet transmission on both normal uplink component (NUL) carrier (e.g., with the BandwidthPart (BWP) also configured on the NUL) and supplementary uplink component (SUL) carrier (e.g., with the BWP also configured on the SUL).

In some implementations, a UE may receive dedicated RA resource configurations associated with one or more NUL carriers. Additionally, in some such implementations, the dedicated RA resource may be associated with one or more UL-BWP configurations of the NUL carrier. The UE may also receive dedicated RA resource configurations associated one or more SUL carriers, while the dedicated RA resource may also be associated with one or more UL-BWP configurations of the SUL carrier.

The dedicated RA resource configuration may be transmitted to the UE through dedicated RRC control signaling, such as an RRC Release message, an RRC Resume message, an RRC Re-establishment message, an RRCReconfiguration message, or any other dedicated DL RRC message in some implementations. In some aspects of the present implementations, however, the UE may only be allowed to choose the dedicated RA resources either on the NUL carrier or on the SUL carrier for small data transmissions (e.g., for one small data transmission). In addition, once the uplink component carrier is selected for the initial transmission of at least one pending packet, the UE may transmit following (HARQ/ARQ) re-transmissions (e.g., for the same packet) using the same component/frequency carrier. Moreover, the UE, in some implementations, may not be allowed to change the operating uplink component carrier during any following re-transmissions.

In some implementations, the UE may be allowed to apply (small) packet transmission on both NUL carrier and SUL carrier (e.g., in parallel). However, once the uplink component carrier is selected for the initial transmission of UL data, the UE may transmit any following (HARQ/ARQ) re-transmissions (e.g., associated with the same packet) in the same component carrier. Moreover, the UE may not be allowed to change the operating uplink component carrier during any following re-transmissions.

In some other implementations, a specific threshold (e.g., DL-RSRP threshold, $RA\_THreshold_{DL\text{-}RSRP}$) may be configured to the UE (e.g., by the NW) to select the dedicated RA resource for small data transmission. For example, if the UE obtains a DL-RSRP measurement having a DL-RSRP value that is larger than (or equal to) an $RA\_THreshold_{DL\text{-}RSRP}$, then the UE may implement small data transmission by accessing the dedicated RA resources on the NUL carrier. Conversely, if the UE obtains a DL-RSRP measurement having a DL-RSRP value that is smaller than the $RA\_THreshold_{DL\text{-}RSRP}$, then the UE may implement small data transmission by accessing the dedicated RA resources on the SUL carrier.

In some implementations, the UE may only be configured with dedicated RA resources on the NUL or SUL carrier. In some other implementations, a specific threshold (e.g., $RA\_THreshold_{DL\text{-}RSRP}'$ or $RA\_THreshold_{DL\text{-}RSRP}''$) may be configured to the UE to determine whether to implement small data transmission on NUL (e.g., the UE is allowed to access dedicated RA resource on NUL only when the DL-RSRP measurement result is higher than $RA\_THreshold_{DL\text{-}RSRP}'$) or SUL (e.g., the UE is allowed to access dedicated RA resource on SUL only when the DL-RSRP measurement result is higher than $RA\_THreshold_{DL\text{-}RSRP}''$). In some such implementations, the UE may otherwise not be allowed to implement packet transmission on the configured dedicated RA resources associated with NUL or SUL carrier.

The above-described thresholds may be transmitted to the UE through dedicated RRC signaling (e.g., RRCReconfiguration message or RRCRelease message or other dedicated DL RRC signaling) or broadcast system information. In some implementations, such thresholds may be pre-configured (e.g., in a Universal Subscriber Identity Module (USIM)) or predefined (e.g., in the technical specification).

Small Data Transmission Using Common RA Resources

In some implementations, the UE may be configured with common random access resource(s) for small data/packet transmission on both normal uplink component (NUL) carrier (e.g., with the BandwidthPart (BWP) also configured on the NUL) and supplementary uplink component (SUL) carrier (e.g., with the BWP also configured on the SUL).

In some implementations, a UE may receive common RA resource configurations associated with one or more NUL carriers. Additionally, in some such implementations, the common RA resource may be associated with one or more UL-BWP configurations of the NUL carrier. The UE may also receive common RA resource configurations associated one or more SUL carriers, while the common RA resource may also be associated with one or more UL-BWP configurations of the SUL carrier.

The common RA resource configuration may be transmitted to the UE through dedicated RRC control signaling, such as an RRC Release message, an RRC Re-establishment message, or any other dedicated DL RRC message in some implementations. The common RA resource configuration may also be configured to the UE through system information (e.g., SIB2), or through group-based control signaling. In some aspects of the present implementations, however, the UE may only be allowed to choose the dedicated RA resources either on the NUL carrier or on the SUL carrier for small data transmissions (e.g., for one small data transmission). In addition, once the uplink component carrier is selected for the initial transmission of at least one pending packet, the UE may transmit following (HARQ/ARQ) re-transmissions (e.g., for the same packet) using the same component/frequency carrier. Moreover, the UE, in some implementations, may not be allowed to change the operating uplink component carrier during any following re-transmissions.

In some implementations, the UE may be allowed to change the operating uplink component carrier for the initial transmission and the following re-transmission for UL data (e.g., one pending packet). For example, the UE may receive a NACK message (e.g., in response to the initial data transmission of one pending packet) while the initial transmission is implemented in the NUL carrier. Then, the UE may switch to SUL carrier for the following re-transmissions.

In some other implementations, a specific threshold (e.g., DL-RSRP threshold, $CRA\_THreshold_{DL-RSRP}$) may be configured to the UE (e.g., by the NW) to select the common RA resource for small data transmission. For example, if the UE obtains a DL-RSRP measurement having a DL-RSRP value that is larger than (or equal to) an $CRA\_THreshold_{DL-RSRP}$, then the UE may implement small data transmission by accessing the common RA resources on the NUL carrier. Conversely, if the UE obtains a DL-RSRP measurement having a DL-RSRP value that is smaller than the $CRA\_THreshold_{DL-RSRP}$, then the UE may implement small data transmission by accessing the common RA resources on the SUL carrier.

In some implementations, the UE may only be configured with common RA resources on either NUL or SUL carrier. In some other implementations, a specific threshold (e.g., $CRA\_THreshold_{DL-RSRP}'$ or $CRA\_THreshold_{DL-RSRP}''$) may be configured to the UE to determine whether to implement small data transmission on NUL (e.g., the UE is allowed to access common RA resource on NUL only when the DL-RSRP measurement result is higher or lower than $CRA\_THreshold_{DL-RSRP}'$) or SUL (e.g., the UE is allowed to access common RA resource on SUL only when the DL-RSRP measurement result is higher or lower than $CRA\_THreshold_{DL-RSRP}''$). In some such implementation, the UE may otherwise not be allowed to implement packet transmission on the configured common RA resources associated with the NUL or SUL carrier.

The above-described thresholds may be transmitted to the UE through dedicated RRC signaling (e.g., RRCReconfiguration message, RRCResume message, RRCRelease message, or other dedicated DL RRC signaling), broadcast system information (e.g., the UE may obtain system information via broadcasting approach, via SI on-demand procedure or via UE-specific control signaling in some cases), or group-based control signaling.

Small Data Transmission Using UL CG Configuration

In some implementations, a UE may be configured with an uplink configured grant configuration for small data transmission on both normal uplink component (NUL) carrier (e.g., along with the BWP configuration on a NUL carrier) and supplementary uplink component (SUL) carrier (e.g., along with the BWP configuration on a SUL carrier).

The UE may receive UL configured grant configurations associated with one or more NUL carriers. The UL configured grant configuration may also be associated with one or more than one UL-BWP configuration of the NUL carrier. The UE may also receive UL configured grant configurations associated with one or more SUL carriers. Additionally, the UL configured grant configuration may be associated with one or more UL-BWP configurations of the SUL carrier.

The UL configured grant configuration may be transmitted to the UE through dedicated RRC control signaling, such as an RRC Release or RRC Re-establishment message, or through other dedicated DL RRC messages.

In some implementations, the UE may only be allowed to choose the UL configured grant either on the NUL carrier or the SUL carrier for the small data transmissions. In addition, once the uplink component carrier is selected for the initial transmission of the UL data (e.g., one pending packet), the UE may transmit the following (HARQ/ARQ) re-transmissions (e.g., of the same packet) in the same component carrier. Moreover, the UE may not be allowed to change the operating uplink component carrier during the following re-transmissions.

In some implementations, the UE may be allowed to choose the UL configured grant on both the NUL carrier and the SUL carrier, for example, for two small data transmission procedures in parallel. In addition, once the uplink component carrier is selected for the initial transmission of one pending packet, the UE may transmit the following (HARQ/ARQ) re-transmissions (e.g., of the same packet) in the same component carrier. Moreover, the UE may not be allowed to change the operating uplink component carrier during the following re-transmissions.

In some implementations, a specific threshold (e.g., DL-RSRP threshold, $CG-THreshold_{DL-RSRP}$) may be configured to the UE to select the target UL configured grant for small data transmission. For example, if the UE obtains a DL-RSRP measurement with a DL-RSRP value that is larger than (or equal to) CG $THreshold_{DL-RSRP}$, then the UE may implement small data transmission by accessing the UL configured grant on the NUL carrier. Conversely, if the UE obtains a DL-RSRP measurement with a DL-RSRP value that is smaller than the CG $Threshold_{DL-RSRP}$, then the UE may implement small data transmission by accessing the UL configured grant on the SUL carrier.

In some implementations, the UE may only be configured with UL configured grant(s) on the NUL or SUL carrier. Moreover, in some implementations, a specific threshold (e.g., CG $THreshold_{DL-RSRP}'$ or CG $THreshold_{DL-RSRP}''$) may be configured to the UE to determine whether to implement small data transmission on the NUL carrier (e.g., the UE may be allowed to access UL configured grant (which is configured) on NUL only when the DL-RSRP measurement result is higher than CG $THreshold_{DL-RSRP}'$) or SUL (e.g., the UE may be allowed to access the UL configured grant (which is configured) on the SUL carrier only when the DL-RSRP measurement result is higher than CG $THreshold_{DL-RSRP}''$). Otherwise, the UE may not be allowed to implement packet transmission on the configured UL configured grant associated with the NUL or SUL carrier.

The above-described thresholds may be transmitted to the UE through dedicated RRC signaling (e.g., RRCReconfiguration message, RRCRelease message, or other dedicated DL RRC signaling) or broadcast system information (the UE may obtain system information through broadcasting approach via SI on-demanding procedure, or via UE-specific control signaling in some cases).

Small Data Transmission Using Supplementary Uplink Release

In some implementations, a serving cell may transmit the information element "supplementaryUplinkRelease=true" to the UE (e.g., through an RRCRelease message, an RRCReconfiguration message, or other dedicated RRC signaling). After receiving this information element, the UE may release all of the configured UL configured grant configuration and/or dedicated RA resource configuration, which are configured for small data transmission, while the UE is staying in the RRC_INACTIVE state.

In some implementations, the serving cell may provide dedicated RA resource configuration/UL configured grant configuration on an SUL carrier only to a UE that supports supplementary uplink. The UE may report to the serving cell whether it supports supplementary uplink operation (e.g., especially for the small data transmission) in a UL control signaling (e.g., through UECapabilityinformation reporting). In contrast, a UE may not expect to receive dedicated RA resource configuration/UL configured grant configuration on the SUL carrier if the UE does not support uplink operations on a supplementary uplink (e.g., especially for the small data transmission).

FIG. 4 is a flowchart illustrating a method (or process) 400 performed by a UE to transmit uplink (UL) data using at least one of an NUL or an SUL frequency carrier, while the UE is in an RRC_INACTIVE state, according to an example implementation of the present application.

As shown in the figure, process 400 may start by receiving, at 410, from a serving cell, through dedicated control signaling, at least one UL resource associated with an NUL frequency carrier and an SUL frequency carrier. The NUL and SUL frequency carriers may include two carriers among a plurality of UL frequency carriers associated with the UE. In some implementations, the UE may receive the at least one UL resource through an RRC message (e.g., such as an RRC release message, an RRC reconfiguration message or any combination of (one or more) RRCReconfiguration message(s) and (one or more) RRCRelease message(s), etc.) received from a base station, for example, while the UE is in an RRC_CONNECTED state.

As described above, the at least one UL resource may include a UL configured grant (CG) resource and a random access (RA) resource, where one of the CG and RA resources is associated with the NUL frequency carrier and the other one of the CG and RA resources is associated with the SUL frequency carrier for the UE to transmit the uplink data to the serving cell (e.g., while the UE is in an RRC_I-NACTIVE state). For example, the at least one UL resource may include an RA resource associated with the NUL carrier and a CG resource associated with the SUL carrier, or vice versa.

After receiving the at least one UL resource (e.g., through an RRC message), process 400 may select, at 420, one of the NUL frequency carrier and the SUL frequency carrier to transmit data (e.g., one or more small packets) received from higher layers to the serving cell (or base station). In some implementations, selecting one of the NUL and SUL frequency carriers may include selecting any of the NUL and SUL frequency carriers with which the CG resource is associated based on the CG resource having a higher priority than the RA resource. That is, the UE may select the NUL carrier if the CG resource is assigned to the NUL (e.g., by the network). Conversely, if the CG resource is assigned to the SUL, the UE may select the SUL carrier for transmitting small data in RRC_INACTIVE state.

In some implementations, the UE may, however, select any of the NUL and SUL frequency carriers with which the RA resource is associated if one or more conditions are met. For example, the UE may select the carrier to which the RA resource is assigned when the CG resource is not available and/or when the UE receives an indicator (e.g., from the serving cell) indicating to the UE to fallback from the CG resource to the RA resource for UL packet transmission (e.g., while in the RRC_INACTIVE state).

Additionally, as described above, the at least one UL resource may include two resources (e.g., first and second resources). In some implementations, selecting one of the NUL frequency carrier and the SUL frequency carrier may include receiving, from the serving cell, through the dedicated control signaling, a downlink (DL)-reference signal received power (RSRP) threshold, and selecting one of the NUL frequency carrier and the SUL frequency carrier based on the received DL-RSRP threshold. Additionally, after selecting the one of the NUL and SUL frequency carriers, the UE may select one of the first and second resources assigned to the selected one of the NUL and SUL frequency carriers for transmitting the at least one uplink packet to the serving cell.

After selecting one of the NUL and SUL frequency carriers process 400 may transmit, at 430, to the serving cell, for example, while the UE is in the RRC_INACTIVE state, the UL data (e.g., at least one UL packet) on the selected one of the NUL and SUL frequency carriers via the at least one UL resource. The process may then end.

As described above, the RA resource may include one of a 2-step RA type resource and a 4-step RA type resource in some implementations. In some such implementations, the UE may select one of the 2-step RA type resource or the 4-step RA resource for UL packet transmission based on a downlink (DL)-reference signal received power (RSRP) threshold associated with the given RA resource type. Additionally, different DL-RSRP thresholds may have been configured by the serving cell to be associated with the NUL frequency carrier and the SUL frequency carrier, and the DL-RSRP threshold may be further associated with the selected UL frequency carrier.

In some implementations, after the UL data (e.g., a small packet) is transmitted to the serving cell, for example, using the NUL frequency carrier, the UE may determine that the (at least one) small packet has to be retransmitted to the serving cell based on a Hybrid Automatic Repeat Request (HARQ) retransmission or an Automatic Repeat Request (ARQ) retransmission. After making such a determination, the UE may retransmit the small packet using the same NUL frequency carrier without using any other one of the plurality of UL frequency carriers.

Additionally, as described above, the UL data may include two or more small packets to be transmitted to the serving cell while the UE is in the RRC Inactive state. In such a scenario, the UE may transmit all data packets using only one of the NUL or SUL carriers. For example, if the UL data includes two small packets (e.g., a first UL packet and a second UL packet), the UE may transmit, to the serving cell, the first and second UL packets on a same one of the NUL and SUL frequency carriers without using any other one of the plurality of UL frequency carriers configured to the UE for transmitting the second packet.

In addition to the above-described small data transmissions (e.g., through either an uplink configured grant configuration or a random access procedure) implemented on a normal uplink component carrier and/or a supplementary uplink component carrier, one or more implementations of the present disclosure, as provided below, describe whether a physical layer problem may impact the small data transmission during an RRC_INACTIVE state, the impact of a failed random access attempt while small data transmission is transmitted through an RA procedure, and a fallback mechanism at the UE side.

It should be noted that the described RRC management design may address an error event of a (small) packet transmission for the UEs that are staying in an RRC_INAC- TIVE state, which is simplified as a "radio link failure" for simplification of the description. Moreover, the described mechanism may be applied based on, but not be limited to, a Radio Link Failure event for the UEs that are in (LTE/NR) RRC_CONNECTED state (e.g., in the NR/LTE protocols).

It should also be noted that the implementations provided in the present disclosure may also be applied to small data transmission to a Secondary Cell Group (SCG). As such, a UE may initiate a random access procedure with an associated Primary Secondary Cell for (small) packet transmission. In addition, the Secondary Node (of the SCG) may also configure specific Uplink Configured Grant configuration for the UE to implement small data transmissions while the UE is staying in the RRC_INACTIVE state. Therefore, the configuration grant configuration and random access procedure. In addition, in some implementations, the existing Signaling Radio Bearer(s) (SRB(s)) or Data Radio Bearer(s) (DRB(s)) may be still active for uplink packet transmission while the UE is staying in the RRC_INACTIVE state. The UE may also support ARQ (and/or HARQ) re-transmission even when the packet transmission is implemented while the UE is staying in the RRC_INACTIVE state.

Based on the fact that ARQ protocols may be supported during RRC_INACTIVE state, in some implementations, one radio bearer (e.g., DRB/SRB) may be configured with a threshold for the maximum number of ARQ re-transmissions of one RLC SDU in the RLC entity of the corresponding radio bearer, as shown in Table 1 below.

TABLE 1

| RLC-Config information element associated with one DRB/SRB |
| --- |
| -- ASN1START |
| -- TAG-RLC-CONFIG-START |
| RLC-Config ::=    CHOICE { |
|   am    SEQUENCE { |
|     ul-AM-RLC    UL-AM-RLC, |
|     dl-AM-RLC    DL-AM-RLC |
|   }, |
|   um-Bi-Directional    SEQUENCE { |
|     ul-UM-RLC    UL-UM-RLC, |
|     dl-UM-RLC    DL-UM-RLC |
|   }, |
|   um-Uni-Directional-UL    SEQUENCE { |
|     ul-UM-RLC    UL-UM-RLC |
|   }, |
|   um-Uni-Directional-DL    SEQUENCE { |
|     dl-UM-RLC    DL-UM-RLC |
|   }, |
|   ... |
| } |
| UL-AM-RLC ::=    SEQUENCE { |
|   sn-FieldLength    SN-FieldLengthAM  OPTIONAL, -- Cond Reestab |
|   t-PollRetransmit    T-PollRetransmit, |
|   pollPDU    PollPDU, |
|   pollByte    PollByte, |
|   maxRetxThreshold    ENUMERATED { t1, t2, t3, t4, t6, t8, t16, t32 } |
| } | described mechanisms related to a radio link failure mechanism may also be applied to an SCG failure event (e.g., when the UE detects a radio link failure for the SCG) while the small data transmission associated with the SCG may be triggered. In addition, the above and below described dedicated control signaling that is exchanged between a Radio Access Network (RAN) and the UE may be delivered through the SRB #1/SRB #2 (e.g., a signaling radio bearer that is associated with the master node) and/or SRB #3 (e.g., a signaling radio bearer that is associated with the secondary node). In some implementations, the secondary node may help to relay the control signaling (and data in the u-plane) through the (wired/wireless) backhaul connection with the master node.

As described, in New Radio Protocols, a UE may be configured to transmit (small) packet transmission during the RRC_INACTIVE state through two approaches: Uplink In Table 1 above, the maxRetxThreshold may be used by the transmitting side of each Acknowledge Mode (AM) RLC entity to limit the number of retransmissions corresponding to an RLC SDU, including its segments. Then, the RLC SDU (or RLC SDU segment) pending in the RLC entity may be configured with one RETX_COUNT to count the number of re-transmissions of the RLC SDU (or RLC SDU segment). In some implementations, the RLC entity (of one DRB/SRB) may indicate to upper layers (e.g., the RRC layer in the UE itself) that a maximum number of (ARQ) retransmissions has been reached if the RETX_COUNT of (at least) one RLC SDU RETX_COUNT reaches to maxRetxThreshold, for example, as shown in Table 2 below. After receiving such indication from the RLC layer, the RRC (sub-)layer may initiate a radio link failure procedure, a failure information procedure, a connection re-establishment procedure, and/or an SCG failure information procedure, as shown in Table 3 below.

TABLE 2

| Detection of max retransmission has been reached in RLC layer |
| --- |
| TS 38.322 3GPP Radio Link Control (RLC) protocol specification<br>When an RLC SDU or an RLC SDU segment is considered for retransmission, the<br>transmitting side of the AM RLC entity shall:<br>    if the RLC SDU or RLC SDU segment is considered for retransmission for the<br>    first time:<br>    set the RETX_COUNT associated with the RLC SDU to zero.<br>        else, if it (the RLC SDU or the RLC SDU segment that is considered for<br>        retransmission) is not pending for retransmission already and the<br>        RETX_COUNT associated with the RLC SDU has not been incremented due to<br>        another negative acknowledgment in the same STATUS PDU:<br>    increment the RETX_COUNT.<br>        if RETX_COUNT = maxRetxThreshold:<br>    indicate to upper layers that max retransmission has been reached. |

Additionally, based on Table 3, the UE may also initiate radio link failure (RLF) procedure, initiate the failure information procedure, initiate the connection re-establishment procedure, and/or initiate the SCG failure information procedure when a small data transmission procedure (e.g., through a random access procedure) fails (e.g., when a random access problem indication from the MAC entity is received). Table 4 below illustrates a definition for an RLF event.

In some implementations, the UE may initiate an RRC (Connection) re-establishment procedure (e.g., while the UE is still staying in RRC_INACTIVE state) or the UE may move to an RRC_IDLE state, e.g., when AS security at the UE side (and/or at the RAN side) is not activated yet, or if AS security has been activated, but SRB2 and at least one DRB have not been setup, while radio link failure event is detected.

TABLE 3

| Detection of radio link failure in RRC layer |
| --- |
| TS38.331 3GPP Radio Resource Control (RRC) protocol specification<br>5.3.10.3Detection of radio link failure<br>The UE shall:<br>    1>    upon T310 expiry in PCell; or<br>    1>    upon random access problem indication from MCG MAC while neither T300,<br>        T301, T304, T311 nor T319 are running; or<br>    1>    upon indication from MCG RLC that the maximum number of retransmissions<br>        has been reached:<br>      2>    if the indication is from MCG RLC and CA duplication is configured and<br>        activated, and for the corresponding logical channel allowedServingCells only<br>        includes SCell(s):<br>        3>    initiate the failure information procedure as specified in 5.7.5 to report RLC<br>            failure.<br>      2>    else:<br>        3>    consider radio link failure to be detected for the MCG i.e. RLF;<br>        3>    if AS security has not been activated:<br>            4>    perform the actions upon going to RRC_IDLE as specified in 5.3.11, with<br>                release cause 'other';-<br>        3>    else if AS security has been activated but SRB2 and at least one DRB have not<br>            been setup:<br>            4>    perform the actions upon going to RRC_IDLE as specified in 5.3.11, with<br>                release cause 'RRC connection failure';<br>        3>    else:<br>            4>    initiate the connection re-establishment procedure as specified in 5.3.7.<br>The UE shall:<br>    1>    upon T310 expiry in PSCell; or<br>    1>    upon random access problem indication from SCG MAC; or<br>    1>    upon indication from SCG RLC that the maximum number of retransmissions<br>        has been reached:<br>      2>    if the indication is from SCG RLC and CA duplication is configured and<br>        activated; and for the corresponding logical channel allowedServingCells only<br>        includes SCell(s):<br>        3>    initiate the failure information procedure as specified in 5.7.5 to report RLC<br>            failure.<br>      2>    else:<br>        3>    consider radio link failure to be detected for the SCG, i.e. SCG RLF;<br>        3>    initiate the SCG failure information procedure as specified in 5.7.3 to report<br>            SCG radio link failure. |

TABLE 4

| Definition of Radio Link Failure Event (UE side) |
| --- |

9.2.7  Radio Link Failure (TS 38.300)
In RRC_CONNECTED, the UE performs Radio Link Monitoring (RLM) in the active
BWP based on reference signals (SSB/CSI-RS) and signal quality thresholds configured by
the network. SSB-based RLM is based on the SSB associated to the initial DL BWP and
can only be configured for the initial DL BWP and for DL BWPs containing the SSB
associated to the initial DL BWP. For other DL BWPs, RLM can only be performed based
on CSI-RS.
The UE declares Radio Link Failure (RLF) when one of the following criteria are met:
   Expiry of a timer started after indication of radio problems from the physical
   layer (if radio problems are recovered before the timer is expired, the UE stops
   the timer); or
   Random access procedure failure; or
   RLC failure.
After RLF is declared, the UE:
   stays in RRC_CONNECTED;
   selects a suitable cell and then initiates RRC re-establishment;
   enters RRC_IDLE if a suitable cell was not found within a certain time after
   RLF was declared.

Small Data Transmission (RLC Failure)

In some implementations, a parameter, such as the RETX_COUNT counter, which may be configured and active while the UE is staying in an RRC_CONNECTED state, may be reset, released, or fixed (e.g., by an RLC entity of a radio bearer), which may be allowed to transmit the associated packets in the RRC_INACTIVE state (e.g., while the UE is moving to an RRC_INACTIVE state). In some implementations, the UE may not increment the RETX_COUNT counter when the UE is in the RRC_INAC-TIVE state.

In some implementations, the new arrived packets (e.g., arriving during the RRC Inactive state), such as new arrival RLC SDUs, may not be configured with an associated RETX_COUNT counter in the associated RLC entity. In some implementations, the UE may not maintain the RETX_COUNT counter for one or more RLC SDUs or RLC SDU segments when the UE is in the RRC_INACTIVE state.

In some implementations, during an RRC_INACTIVE state, the RLC entity may not indicate the "maximum number of retransmissions has been reached" to the RRC layer (e.g., when the RETX_COUNT=maxRetxThreshold) even though the packet transmissions may have been implemented during an RRC_INACTIVE state.

In some implementations, during an RRC_INACTIVE state, the RRC layer may not consider the RLF to be detected if the RRC layer receives the indication from the RLC entity (e.g., of an SRB and/or of a DRB) that the maximum number of retransmissions has been reached. More specifically, the UE may not initiate a radio link failure procedure, a failure information procedure, a connection re-establishment procedure, and/or an SCG failure information procedure if the RRC layer receives the indication from RLC entity that the maximum number of retransmissions has been reached.

In some additional implementations, the RLC entity may not count the RETX_COUNT associated with the RLC SDU during the small data transmission. Please also note, in some implementations, the UE may release the RETX_COUNT (or stop counting the RETX_COUNT) while one small data transmission procedure is terminated. In some additional implementations, the RLC SDU or RLC SDU segment considered for retransmission during one SDT procedure may also be released/dropped with the termination of SDT procedure.

Please note, in some implementations, the RLC entity may keep counting the RETX_COUNT associated with the RLC SDU during the small data transmission if the UE falls back from a CG-based small data transmission procedure to an RA-based small data transmission procedure. In some implementations, the RLC entity may stop counting the RETX_COUNT associated with the RLC SDU during the small data transmission (or release the RETX_COUNT) if the UE falls back from a CG-based small data transmission procedure to an RA-based small data transmission procedure. In some additional implementations, the RLC SDU or RLC SDU segment considered for retransmission during one SDT procedure may also be released/dropped with the fallback (e.g., from CG-based SDT procedure to RA-based SDT procedure) of the SDT procedure.

In some implementations, the RLC entity may stop counting the RETX_COUNT associated with the RLC SDU during the small data transmission (or release the RETX_COUNT) if the UE falls back from an SDT procedure to a non-SDT procedure (e.g., one conventional RRC establishment procedure or RRC resume procedure). In some additional implementations, the RLC SDU or RLC SDU segment considered for retransmission during one SDT procedure may also be released/dropped with the fallback (e.g., from SDT procedure to non-SDT procedure) of the SDT procedure.

In some implementations, the parameter maxRetxThresh-old may be set to a very large value (e.g., infinite) while the UE is staying in the RRC_INACTIVE state (e.g., while an RRC-inactive-state-specific radio bearer configuration may be configured to the UE). As such, the UE may re-configure its radio bearer configuration based on this RRC-inactive-state-specific radio bearer configuration after the UE moves to the RRC_INACTIVE state (or after receiving an RRC release message with suspend configuration). In some implementations, the UE may release or suspend the stored RRC-inactive-state-specific radio bearer configuration after the UE moves to an RRC_CONNECTED state from the RRC_INACTIVE state. In some implementations, the radio bearer may be configured with one maxRetxThreshold for the radio bearer (or RLC bearer) while the UE is in RRC_CONNECTED state. In contrast, the same radio bearer (with the same radio bearer ID) would be configured without maxRetxThreshold for SDT (e.g., as part of the RRC-inactive-state-specific radio bearer configuration) and so the UE would not count the RETX_COUNT for RLC re-retransmission associated with the same radio bearer while the UE is implementing small data transmission during RRC_INACTIVE state.

In some implementations, the UE may release the stored RRC-inactive-state-specific radio bearer configuration after the UE moves to an RRC_IDLE state or after the UE moves to another Radio Access Technology (RAT) (e.g., from NR RRC_INACTIVE state to LTE (RRC)-CONNECTED/IN-ACTIVE/IDLE state). Therefore, in the RLC layer, the value of maxRetxThreshold may be re-configured according to the RRC state transitions. In some implementations, the value of an existing RETX_COUNT counter may be reset according to the RRC state transitions. In some other implementations, the value of the existing RETX_COUNT counter may not be reset according to the RRC state transitions.

In some implementations, the parameter maxRetxThreshold may not be configured for a UL AM RLC while the UE is staying in the RRC_INACTIVE state (e.g., an RRC-inactive-state-specific radio bearer configuration may be configured to the UE). The UE may re-configure its radio bearer configuration based on the RRC-inactive-state-specific radio bearer configuration after the UE moves to an RRC_INACTIVE state). If the parameter maxRetxThreshold is not configured, the UE may not maintain any RETX_COUNT for any RLC SDU or RLC SDU segment in some implementations.

In some implementations, a full configuration approach may be implemented for the RRC-inactive-state-specific radio bearer configuration. For example, an explicit flag (e.g., fullConfig=true) may be configured to the UE, for example, through dedicated control signaling (e.g., RRCReconfiguration message or RRCRelease message with or without suspend configuration) to instruct the UE to move to an RRC_INACTIVE/IDLE state. After receiving the flag (fullConfig=true) in the dedicated control signaling, the UE may initiate a full configuration after the UE moves to the RRC_INACTIVE state (e.g., to reset the existing RRC configuration and then apply the RRC configurations associated with the RRC_INACTIVE state). In some implementations, the full configuration may be applied to the radio bearers (or RLC bearers/logical channels) which may still be active (for packet transmission during the RRC_INACTIVE state) after the UE moves to the RRC_INACTIVE state. In some other implementations, the full configuration may be applied to all of the radio bearers after the UE moves to the RRC_INACTIVE state (e.g., the serving cell may reset the RRC configurations associated with the RRC_INACTIVE state by delivering a full configuration instruction associated with the RRC configuration for the RRC_INACTIVE state).

In some implementations, the UE may apply a full configuration directly (e.g., after the UE moves to the RRC_I-NACTIVE state) without receiving an explicit flag, e.g., of fullConfig. Baseline). In some implementations, the RLC operation may not be impacted by any RRC state transitions. In some implementations, for an RETX_COUNT counter (e.g., associated with one RLC SDU or SDU segment), which may be initiated/maintained while the UE is in the RRC_CONNECTED state, the value of RETX_COUNT counter may be kept after the UE moves to the RRC_INAC-TIVE state.

In addition, the RETX_COUNT may still be increased if the RLC SDU retransmission occurs during the packet transmission after the UE moves to the RRC_INACTIVE state. In contrast, an RETX_COUNT counter (e.g., associated with an RLC SDU or SDU segment, which is initiated in the RLC entity for initial transmission) may (also) be initiated/maintained while the UE is in the RRC_INAC-TIVE state. The corresponding RETX_COUNT may also be increased if the RLC SDU retransmission occurs during the RRC_INACTIVE state.

After the UE moves to an RRC_CONNECTED state, the value of RETX_COUNT counter may be maintained. Then, the corresponding RETX_COUNT may also be increased if the RLC SDU retransmission occurs after the UE moves from the RRC_INACTIVE state back to RRC_CON-NECTED state. While the UE is in the RRC_INACTIVE state or RRC_CONNECTED state, if the RETX_COUNT=maxRetxThreshold (e.g., in a correspond-ing radio bearer) occurs, the RLC entity (of the radio bearer) may indicate to the upper layers (e.g., the RRC layer) that maximum retransmission has been reached. After receiving such an indication from the RLC layer, the RRC layer may implement (at least) one of the following four mechanisms.

First Mechanism: in some implementations, the RRC entity (or RRC layer) may move to the RRC_IDLE state (e.g., the Access Stratum (AS) security may be activated for the packet transmission during the RRC_INACTIVE state) after receiving an (RLC failure) indication from the RLC entity (e.g., of an SRB and/or of a DRB). In addition, the UE inactive AS context (with/without the UL configured grant configured for (small) packet transmission during an RRC_INACTIVE state or with/without the associated (dedi-cated/common) random access resource configuration for small data transmission) may also be released after the UE moves to the RRC_IDLE state. Then, the UE may try to build the RRC connection with the serving cell again (e.g., by initiating RRC establishment/setup procedure with the UE).

Second Mechanism: in some implementations, the UE may initiate an RRC resume procedure (e.g., such as the RRC resume procedure in LTE/NR protocols) with the serving cell (e.g., while the UE is staying in the RRC_I-NACTIVE state) to try to resume the RRC connection with the serving cell (or serving RAN) again.

Third Mechanism: in some implementations, the UE may initiate an RRC re-establishment procedure (e.g., such as the RRC re-establishment procedure in the LTE/NR protocols) with the serving cell (e.g., while the UE is staying in the RRC_INACTIVE state) to try to re-build the RRC connec-tion with the serving cell (or serving RAN) again.

Fourth Mechanism: in some implementations, the UE may stay in the RRC_INACTIVE state, but stop small data transmission during an RRC_INACTIVE state. In some implementations, the UE may suspend the UL configured grant configuration provided/configured for (small) packet transmission during the RRC_INACTIVE state. In some implementations, the UE may release the UL configured grant configuration (and/or the (dedicated/common) random access resources) for (small) packet transmission during an RRC_INACTIVE state (e.g., when a radio link failure event occurs during an RRC_INACTIVE state). In some other implementations, the UE may suspend the UL configured grant configuration for (small) packet transmission during an RRC_INACTIVE state (e.g., when a radio link failure event occurs during an RRC_INACTIVE state). In some other implementations, the UE may determine that the UL con-figured grant (and/or the random access resource) configured for packet transmission is not valid (or is deactivated) during an RRC_INACTIVE state (e.g., when a radio link failure event occurs during an RRC_INACTIVE state). In some other implementations, the UE may determine that the Timing Advance (TA) is not valid (e.g., when a TA timer has expired) during an RRC_INACTIVE state (e.g., when a radio link failure event occurs during an RRC_INACTIVE state). In some other implementations, the UE may flush the RLC buffers and/or HARQ buffers during an RRC_INAC- TIVE state (e.g., when a radio link failure event occurs during an RRC_INACTIVE state). In some implementations, the UE may also stop transmitting packets through random access procedure (e.g., instead, only 4-step or 2-step Random Access procedure for non-SDT procedure, such as RRC Establishment/Re-establishment/Resume procedure as shown in the 3GPP technical specifications (TS 36.331 v16.0.0/TS 38.331 v16.0.0/TS 36.321 v16.0.0/TS 38.321 v16.0.0), may be applied). Therefore, the UE may still apply the random access procedure for a RAN Notification Area procedure or RRC Connection Resume procedure through the conventional 4-step/2-step RA procedure. In some implementations, the MAC entity may be configured with prioritization rules to prioritize the pending packets of a specific Signaling Radio Bearer (e.g., SRB #1, the Signaling Radio Bearer which conveys the RRC signaling) or a logical channel associated with the specific SRB. In addition, the MAC entity may further de-prioritize the pending packets from (at least) one Data Radio Bearer or the logical channel(s) associated with the DRB(s) while both the RRC signaling and (small) packet transmission are pending to be transmitted through a random access procedure.

In some implementations, different radio bearer configurations (e.g., with one set of radio bearer configurations being configured for packet transmission during an RRC_INACTIVE state and another set of radio bearer configurations being configured for packet transmission during an RRC_CONNECTED state) may be configured to the UE. For example, the set of radio bearer configurations for the RRC_INACTIVE state may be configured via an RRC release (e.g., with the information element 'suspendconfig') message. For example, different maxRetxThreshold values, which are associated with different RRC states, may be configured to the UE. In some implementation, the maxRetxThreshold may become an optional IE. In addition, in the radio bearer configuration (for packet transmission during an RRC_INACTIVE state), the serving cell may not configure the maxRetxThreshold (e.g., in an RLC-config associated with a radio bearer) to the UE for the packet transmission during an RRC_INACTIVE state. In some implementations, one additional value (e.g., infinite or a very large number) may be configured to the maxRetxThreshold in the RLC configuration (which may be applied only when the UE moves to the RRC_INACTIVE state). Such a mechanism may implicitly prevent the UE from initiating a radio link failure procedure while the UE is in the RRC_INACTIVE state.

In some implementations, at the UE side, the radio bearer configuration associated with the RRC_INACTIVE state may be stored by the UE in the UE Inactive AS context. Then, the UE may re-configure the radio bearers (or RLC bearers/logical channels) by applying the radio bearer configurations stored in the UE inactive AS context. In addition, in some implementations, the UE may still store the radio bearer configurations associated with the RRC_INACTIVE state after the UE moves to the RRC_CONNECTED state. As such, when subsequently, the UE moves back to the RRC_INACTIVE state (e.g., from the RRC_CONNECTED state), the UE may restore (or resume) the stored radio bearer configurations (and/or RLC bearer configurations/logical channel configurations) directly. In some implementations, the serving cell may also store the radio bearer configurations associated with the RRC_INACTIVE state. Therefore, the serving cell may also instruct the UE to update the stored radio bearer/RLC bearer/logical channel configurations (associated with the RRC_INACTIVE state), for example, through delta signaling (e.g., by transmitting one "ToAddModList", in the "RRCRelease message with suspend configuration" or in the RRC (Connection)Reconfiguration message to the UE while the serving cell is instructing the UE to move to the RRC_INACTIVE state, to modify the stored radio bearer configurations associated with the RRC_INACTIVE state).

As another example, if the RRC-CONNECTED UE does not receive the delta signaling and/or instruction to update the stored radio bearer configurations from the serving cell via the RRC Release message with suspend configuration, the RRC_CONNECTED UE may move to an RRC_INACTIVE state and the RRC_INACTIVE UE may resume or restore the stored radio bearer configurations. In some implementations, the serving cell may instruct the UE to update the stored radio bearer/RLC bearer/logical channel configurations by configuring a new RRC configuration to the UE. After receiving the new RRC configuration, the UE may overwrite the stored radio bearer/RLC bearer/logical channel configuration by the new RRC configuration. In some other implementations, the serving cell may instruct the UE to release the stored radio bearer configurations (for (small) packet transmission) by transmitting an explicit instruction to the UE through dedicated control signaling (e.g., via an RRC (Connection)Reconfiguration message).

It should be noted that in some implementations, two or more than two of the described mechanisms in this disclosure may be implemented jointly by one UE. In some such implementations, each described mechanism may be applied to one (or more than one) radio bearer at the UE side.

Small Data Transmission (Physical Layer Problem Detection)

In some implementations, a UE may not be configured to detect physical layer problems while the UE is in the RRC_INACTIVE state. As such, the lower layers may not transmit 'in-sync'/'out-of-sync' indicators to the RRC layer even if a UL Configured Grant configuration is provided for the UE to transmit packets during the RRC_INACTIVE state. In some implementations, the UE may not be configured with radio link monitoring configuration (e.g., RadioLinkMonitoringConfig) when the UE is in the RRC_INACTIVE state. In some implementations, the physical layer of the UE may not indicate the "in-sync/out-of-sync" indication to the higher layers (e.g., RRC layer) of the UE even when the radio link quality is worse than a defined threshold (e.g., Qout) for all resources in the set of resources for radio link monitoring when the UE is in the RRC_INACTIVE state. In some implementations, the RRC layer (or the RRC entity) of the UE may ignore the "in-sync/out-of-sync" indication received from the lower layers when the UE is in the RRC_INACTIVE state.

In some implementations, the UE may be configured to detect physical layer problems while the UE is in the RRC_INACTIVE state. Therefore, the lower layers may transmit 'in-sync'/'out-of-sync' indications to the RRC layer. In some implementations, the UE may not be configured with radio link monitoring configuration (e.g., RadioLinkMonitoringConfig) when the UE is in the RRC_INACTIVE state. In some implementations, only SSB(s) may be configured/indicated as a detected resource (or a radio link monitoring reference signal) for detecting physical layer problems in the RRC_INACTIVE state.

In some implementations, a UL Configured Grant configuration may be provided for the UE to transmit packets during the RRC_INACTIVE state. In addition, when a physical layer problem is detected (e.g., when the UE receives N310 consecutive "out-of-sync" indications from the serving cell), the UE may not be allowed to use the configured UL Configured Grant (e.g., associated with the serving cell) for uplink packet transmissions during the RRC_INACTIVE state. Conversely, the UE may be able to transmit small packets through a 2-step/4-step (contention-free and/or contention-based) random access procedure if a physical layer problem is detected with the serving cell. In some implementations, when a physical layer problem is detected (e.g., UE receives N310 consecutive "out-of-sync" indications from the serving cell), the UE may trigger a BSR/SR, and/or initiate an RA procedure if at least UL data for a logical channel becomes available (and/or none of other logical channels contains any available UL data).

In some implementations, one specific Qout value (e.g., Qout_inactive) may be configured to the UE for the lower layers (e.g., PHY layer) to identify whether an out-of-sync indication should be generated for the upper layers (e.g., when a Layer-1 RSRP value for the serving cell is lower than the Qout_inactive value). As such, the lower layer may determine to generate an In-Sync/Out-of-Sync (IS/OOS) indicator based on the configured Qout_inactive value. In some implementations, the UE may determine whether a PHY layer problem has occurred based on the Layer-1/Layer-3 DL-RSRP measurement result and the Qout_inactive. For example, the UE may determine the occurrence of a PHY layer problem when the Layer-1 DL-RSRP measurement result is lower than a threshold (e.g., Qout_inactive). In another example, the UE may determine that a PHY layer problem has occurred when the Layer-3 DL-RSRP measurement result is lower than the threshold (Qout_inactive).

In the UE's perspective, the received UL configured grant configuration may be suspended (or be released) after the physical layer problem is detected in the UE side. Then, the suspended UL configured grant may resume/be reinitiated at the UE side if the physical layer problem is recovered from (e.g., the UE may trigger T310 and count whether the UE could receive N311 consecutive "in-sync" indications by starting and counting an 'in-sync' counter, such as the 'Counter N311' in the LTE/NR protocols of the serving cell while T310 is running). The UE may stop T310 and consider the physical layer problem is recovered from if the UE receives N311 consecutive "in-sync" indications of the serving cell from the lower layer of the UE side before the timer T310 expires in the UE side. Here, the UE may set an 'out-of-sync' counter (e.g., such as the 'Counter N310' in the LTE/NR protocols) to count the number of 'out-of-sync' indications received from the PHY layer. The UE may increment the 'out-of-sync' counter upon reception of an 'out-of-sync' indicator from the PHY layer and while the T310 has stopped. Then, the UE may start T310 if the 'out-of-sync' counter reaches the threshold N310.

In addition, the 'out-of-sync' counter may be reset upon reception of an 'in-sync' indication from the PHY layer or upon reception of dedicated control signaling (e.g., RRCReconfiguration message) from the serving cell. The 'out-of-sync' counter may also be reset while the UE is initiating (e.g., during an RRC (connection) establishing procedure) or resuming (e.g., during an RRC (connection) resume procedure) or re-establishing (e.g., during RRC (connection) re-establishing procedure) an RRC connection procedure with the serving cell or when the UE moves to an RRC_IDLE state or an RRC_CONNECTED state.

In some implementations, the 'out-of-sync' counter may not be reset after the UE moves from the RRC_INACTIVE state to the RRC_CONNECTED state. In some implementations, the 'out-of-sync' counter may be initiated while the UE is staying in the RRC_CONNECTED state. In addition, the 'out-of-sync' counter may still be active after the UE moves to the RRC_INACTIVE state if the UE is also configured with (small) packet transmission during an RRC_INACTIVE state.

In some implementations, the 'in-sync' counter may be reset upon reception of an 'out-of-sync' indication from the PHY layer or upon reception of dedicated control signaling (e.g., RRCReconfiguration message) from the serving cell. The 'in-sync' counter may also be reset while the UE is initiating (e.g., during RRC (connection) establishing procedure)/resuming (e.g., during RRC(connection) resume procedure)/re-establishing (e.g., during RRC(connection) re-establishing procedure) the RRC connection procedure with the serving cell or while the UE moves to RRC_IDLE state or RRC_CONNECTED state. In some implementations, the 'in-sync' counter may not be reset after the UE moves from the RRC_INACTIVE state to the RRC_CONNECTED state. In some implementations, the 'in-sync' counter may be initiated while the UE is staying in the RRC_CONNECTED state. In addition, the 'in-sync' counter may still be active after the UE moves to the RRC_INACTIVE state if the UE is also configured with (small) packet transmission during an RRC_INACTIVE state.

If the UL configured grant configuration is suspended during a physical layer problem (e.g., while the T310 is initiated/reset for 'in-sync' indication counting), in some implementations, the suspended UL configured grant configuration may be released if a radio link failure event is detected at the UE side (e.g., the UE may trigger T310 and count whether UE could receive N311 consecutive "in-sync" indications from the serving cell while T310 is counting. The UE may determine that a radio link failure event (associated with the serving cell) is detected if the UE fails to receive N311 consecutive "in-sync" indications of the serving cell from the lower layer of the UE side before the counting T310 expires. In some implementations, the UE may be able to transmit small packets through a (contention-free and/or contention-based) random access procedure if a radio link failure problem is detected with the serving cell. In some other implementations, the suspended UL configured grant configuration may resume while T310 has stopped counting. In some implementations, the UL configured grant configuration may be released while T310 is initiated/reset for an 'in-sync' indication counting.

In some implementations, the UL configured grant configuration (associated with the serving cell) may be suspended when a physical layer problem (or radio link failure event) occurs. Moreover, the UE may re-select other suitable cell(s) as the serving cell while the UE is staying in the RRC_INACTIVE state. Subsequently, when the UE re-camps to the same cell (associated with the UL configured grant configuration) successfully, the UE may be able to resume the suspended UL configured grant configuration to transmit the UL data through the UL configured grant configuration to the same cell (e.g., N311 consecutive "in-sync" indications are obtained beforehand).

In some implementations, the UE may resume the suspended UL configured grant configuration only through the dedicated control signaling from the serving cell (e.g., in the RRCResume message/RRC Re-establishment message/RRCReconfiguration message or other downlink dedicated RRC signaling). In some other implementations, one additional validity-timer may be started with the suspended UL configured grant configuration. The UE may be allowed to access the suspended UL configured grant configuration before the given validity-timer expires (regardless of whether the UE has camped on other cells or not). Otherwise, the UE may release the suspended UL configured grant configuration after the timer expires.

In some implementations, when a physical layer problem is detected (e.g., UE receives N310 consecutive "out-of-sync" indications from the serving cell) during an RRC_I-NACTIVE state, the UE may determine that Timing Advance (TA) is not valid (e.g., determine that the TA timer has expired). In some implementations, when a physical layer problem is detected (e.g., UE receives N310 consecutive "out-of-sync" indications from the serving cell) during an RRC_INACTIVE state, the UE may flush (all of) its RLC buffers and/or HARQ buffers.

In some implementations, the RRC layer of the UE may (or may not) reset a counter (e.g., 'in-sync' counter and/or 'out-of-sync' counter for the counting of IS/OOS indications, respectively) when the UE receives an RRC message (e.g., RRC Release message with suspend configuration, an RRC message indicates to the UE to perform (small) packet transmission when the UE is in the RRC_INACTIVE state). The RRC layer of the UE may stop the counter (e.g., 'in-sync' counter) upon reception of N311 consecutive 'in-sync' indications from the lower layers. The RRC layer may reset the 'in-sync' counter upon reception of (at least) one 'out-of-sync' indication before the running timer T310 expires. The RRC layer of the UE may reset the counter (e.g., 'in-sync' counter and/or the 'out-of-sync' counter) upon receiving an RRC message (e.g., RRCReconfiguration with reconfigurationWithSync) for that cell group, or upon initiating the RRC connection re-establishment procedure. The RRC layer of the UE may increment the 'in-sync' counter until the T310 timer expires. The RRC layer of the UE may start the timer (e.g., T311 timer) when the RRC connection re-establishment procedure (or an RRC Resume procedure, to the RRC_INACTIVE UE) is initiated.

In some implementations, for an RRC_INACTIVE UE or a UE in the RRC_INACTIVE state, the UE may initiate an RRC Resume (e.g., such that the UE may stay in the RRC_INACTIVE state after the physical layer problem is detected) or an RRC Establishment (e.g., such that the UE may move to the RRC_IDLE state automatically after the physical layer problem is detected) or Re-establishment procedure with the serving cell after a physical layer problem is detected in the UE side. For example, the UE may trigger T310' and count whether the UE could receive N311 consecutive "in-sync" indications of the serving cell while T310' is counting. The UE may stop T310' and consider the physical layer problem is recovered if the UE receives N311' consecutive "in-sync" indications of the serving cell from the lower layer of the UE before the counting T310' expires in the UE side.

The non-SDT procedures (e.g., RRC Resume/Establishment/Re-establishment procedure) may be implemented through the 2-step/4-step contention-based random access procedure or contention-free random access procedure (e.g., by accessing the dedicated random access resources configuration provided also for small data transmission). In some implementations, the T310' may be initiated while the UE is in an RRC_CONNECTED state. In addition, the T310' may be still active after the UE moves to the RRC_I-NACTIVE state while the UE is configured with (small) packet transmission. Moreover, in some other implementations, the T310' may be still active if the UE moves from the RRC_INACTIVE state to an RRC_CONNECTED state. In some implementations, the T310' may be stopped (or reset) after the UE moves from the RRC_INACTIVE state to an RRC_CONNECTED state (or an RRC_IDLE state). In some implementations, the T310' may be stopped (or reset)

after the UE initiates an RRC establishment/resume/re-establishment procedure with the serving cell. In some implementations, the UE may initiate an RRC Resume procedure (such that the UE may stay in the RRC_INAC-TIVE state after a radio link failure event is detected).

In some other implementations, the UE may initiate an RRC Establishment (e.g., such that the UE may move to an RRC_IDLE state automatically after a radio link failure event is detected) or Re-establishment procedure with the serving cell if a radio link failure event is detected by the UE (e.g., the UE may trigger T310' and count whether the UE could receive N311' consecutive "in-sync" indications of the serving cell while T310' is counting. The UE may consider a radio link failure event is detected if the UE fails to receive N311' consecutive "in-sync" indications of the serving cell from the lower layer of the UE before the counting T310' expires. The RRC Resume/Establishment/Re-establishment procedure may be implemented through the 2-step/4-step contention-based random access procedure or contention-free random access procedure (e.g., by accessing the dedicated random access resources configuration provided also for small data transmission).

In some implementations, the UE may report the cause of reporting in the RRCResumeRequest message/RRC Re-establishment Request message to the serving cell. For example, one additional IE, such as 'Physical Layer Problem', 'Radio Link Failure', or 'RLC Failure event' may be transmitted to the serving cell through the RRCResumeR-equest/RRC Re-establishment Request message to the serving cell.

In some other implementations, the UE may report the cause of reporting in the RRCResumeComplete message/RRC Re-establishment Complete message to the serving cell. For example, one additional IE, such as 'Physical Layer Problem', 'Radio Link Failure', or 'RLC Failure event' may be transmitted to the serving cell through the RRCResume-Complete/RRC Re-establishment Complete message to the serving cell.

Also, in some implementations, another T311' may be started if a radio link failure event is detected by the UE while UE is implementing small data transmission during the RRC_INACTIVE state and the UE initiates an RRC re-establishment procedure (or RRC Resume procedure) with the serving cell. Then, the counting T311' may be stopped upon the UE selecting a suitable NR cell or a cell using another RAT (e.g., E-UTRA). In some implementations, after T311' expires, the UE may move to an RRC_IDLE state automatically (such that the stored UE inactive context and with the UL configured grant configuration and dedicated random access resource configuration provided for small data transmission during an RRC_INAC-TIVE state may be released accordingly after the UE moves to the RRC_IDLE state).

In some implementations, a UE may receive a set of radio link failure parameters, such as the set of parameters shown in Table 5 below, from the serving cell for the detection/recovery of a physical layer problem and/or a radio link failure event from the serving cell.

TABLE 5

```
RLF-TimersAndConstants ::=   SEQUENCE {
   t310           ENUMERATED {ms0, ms50, ms100, ms200, ms500,
ms1000, ms2000, ms4000, ms6000},
   n310           ENUMERATED {n1, n2, n3, n4, n6, n8, n10, n20},
   n311           ENUMERATED {n1, n2, n3, n4, n5, n6, n8, n10},
```

TABLE 5-continued

```
...,
[[
t311         ENUMERATED {ms1000, ms3000, ms5000, ms10000,
ms15000, ms20000, ms30000}
]],
[[
t316-r16    SetupRelease {T316-r16 } OPTIONAL -- Cond MCG-Only
]]
```

In some implementations, the UE may reuse the same set of parameters for the detection/recovery of a physical layer problem and/or a radio link failure event. In some other implementations, another independent set of parameters (e.g., {T310', N310', T311', N311', T316'}) may be configured to the UE through dedicated control signaling (e.g., RRCRelease message with/without suspend configuration or RRCReconfiguration message) or broadcast message (e.g., broadcasting system information) for the detection/recovery of a physical layer problem or a radio link failure event while the UE is staying in the RRC_INACTIVE state.

Detecting and Reporting a Random Access Failure

In some implementations, a UE (e.g., the RRC layer in the Access Stratum or the Upper layers in the Non-Access Stratum) may receive a random access failure report while the UE is trying to transmit data through an RA procedure. In some implementations, one maximum number of RA attempts (e.g., the number of 'Random Access problem', which is transmitted by the MAC layer to the upper layer) for packet transmission (e.g., $MAX\_RA_{Inactive}$) may be configured to the UE. More specifically, the $MAX\_RA_{Inactive}$ may be configured separately for 2-step RACH and 4-step RACH procedures. Then, the UE may count the number of failed RA attempts while the UE is trying to transmit data through the random access procedure.

In some implementations, the number of failed random access attempts for other purposes (e.g., for RRC Connection Resume procedure) may or may not be considered jointly while the UE is counting the number of failed RA attempts for packet transmission. In some implementations, the MAC layer may indicate a Random Access problem to the upper layers while PREAMBLE_TRANSMISSION_COUNTER=preambleTransMax+1. In such a case, the UE may increment the PREAMBLE_TRANSMISSION_COUNTER (e.g., by configuring PREAMBLE_TRANSMISSION_COUNTER=PREAMBLE_TRANSMISSION_COUNTER+1) every time that one preamble has been transmitted by the lower layer (e.g., the PHY layer) in the random access procedure. The preambleTransMax is a parameter that defines when the MAC entity should declare an ongoing random access procedure has failed (e.g., a random access problem has occurred).

In some implementations, when the number of failed RA attempts (for packet transmission) reaches a threshold (e.g., the $MAX\_RA_{Inactive}$), the UE (e.g., the RRC layer/RRC entity) may stop packet transmission during the RRC_INACTIVE state. For example, the random access procedure initiated for packet transmission may be released (and the pending buffer may also be emptied along with the release of the random access procedure). Moreover, in some implementations, the UE may try to resume the RRC connection with the UE (e.g., by initiating an RRC resume procedure) to report the failure condition to the serving RAN. The failed RA attempts for packet transmission may be stored in the UE as part of the Minimum Driver Test (MDT) record or Early measurement report.

In some implementations, the number of failed attempts is associated with per pending Transport Block (TB) (which may include (at least) one Medium Access Control Packet Data Unit (MAC PDU)) in the buffer of the UE. Therefore, the UE may count the number of (failed) RA attempts associated with each pending TB independently. Moreover, for each TB, the counter may be initiated while the TB is multiplexed by the MAC layer for TB transmission through a random access procedure. The counter associated with the TB may then be released if the TB is removed by the MAC entity (from the pending buffer). In some additional embodiments, more than one TB may be multiplexed into one Uplink Grant for the packet transmission through the random access procedure. In some such embodiments, the counter for each TB may also be incremented with each 'failed random access attempt' independently.

In some implementations, the UE may obtain the value of $MAX\_RA_{Inactive}$ through dedicated control signaling (e.g., RRCReconfiguration message) or through broadcasting information (e.g., broadcasting system information). In some implementations, the value of $MAX\_RA_{Inactive}$ may be pre-defined in the technical specification.

In some implementations, the UE may record the random access failure event when an RA failure occurs during the RRC_INACTIVE state. In addition, the UE may further indicate that the random access failure has occurred during a packet transmission while the UE is staying in the RRC_INACTIVE state. The UE may also record the parameters of the failed RA attempts. For example, the UE may record the size of the transmitted packet in the failed RA attempt.

In some implementations, the UE may report the random access failure information after the UE connects with the Radio Access Network (RAN) again (e.g., the random access failure information may be stored as part of the MDT record or may be stored as part of the Idle-Measurement report, and then the UE may report to the Core Network and/or the RAN after the UE connects with the CN and/or RAN again.

Fallback Mechanism

In some implementations, a UE that is configured with UL configured grant for small data transmission during an RRC_INACTIVE state may also be allowed to transmit small data through a 2-step/4-step contention-based/contention-free random access procedure. In some implementations, for a UE in the RRC_INACTIVE state, if the UL that has been configured with configured grant configuration is suspended/released, the UE may fallback to small data transmissions through random access procedures in some circumstances (e.g., when an RLC failure event occurs in one or more radio bearers).

In some implementations, one explicit instruction may be transmitted from the serving cell to the UE to explicitly indicate whether the UE is allowed to fallback to a random access procedure for small data transmission or not. For example, if the indicator received from the network indicates that the UE is not allowed to fallback to a random access procedure for small data transmission, the UE may not trigger SR and/or may not initiate an RA procedure if at least some UL data for a logical channel become available (and/or none of other logical channels contains any available UL data) and/or a BSR has been triggered. More specifically, the logical channel may not be a Common Control Channel (CCCH). In some additional implementations, the UE may fallback to small data transmissions through a random access procedure implicitly, for example, when the RLC failure event occurs in one or more radio bearers.

In some implementations, the UE may not be allowed to fallback to access small data transmissions through a random access procedure in some specific events (e.g., when a random access failure event or physical layer problem occurs). For a UE in the RRC_INACTIVE state, when small data transmissions through a UL configured grant configuration fails, the UE may first fallback to small data transmission by applying dedicated RA resources (e.g., when it is already configured to the UE). Otherwise, the UE may fallback to small data transmission by applying common RA resources (which may be broadcast by the serving cell through system information).

In some implementations, the serving cell may also indicate whether the UE is allowed to fallback (e.g., from a UL configured grant configuration) to access the random access resources for small data transmissions or not when one or more air link problems (e.g., an RLC failure event) occurs during small data transmissions on the UL configured grant. Moreover, the serving cell may transmit the indicator by transmitting an Information Element (IE) to the UE through dedicated control signaling (e.g., RRC Release message with suspend configuration or RRCReconfiguration message) or broadcasting system information (e.g., system information block type 2).

In some implementations, the UE may be configured with dedicated random access resources for small data transmissions. Then, in some specific cases (e.g., the random access failure event occurs when the UE (in the RRC_INACTIVE state) tries to implement small data transmissions through the configured random access resources), the UE may fallback to implement small data transmissions through common random access resources, which may be broadcast through the system information of the serving cell.

In some implementations, the cell may also indicate whether the UE is allowed to fallback to access the common random access resources for small data transmissions or not when one or more air link problems (e.g., am RA failure event, an RLF detection, etc.) occurs for the dedicated random access resources for small data transmissions. Moreover, the serving cell may transmit the indication by transmitting an Information Element to the UE through dedicated control signaling (e.g., RRC Release message with suspend configuration or RRCReconfiguration message) or broadcasting system information (e.g., system information block type 2, SIB2). In some other implementations, the rules may be pre-defined in the USIM and in the technical specification.

In some implementations, the fallback mechanism may be applied during the (ARQ/HARQ) re-transmissions of small data (e.g., one pending packet), for example, when the UE is staying in the RRC_INACTIVE state. In some other implementations, the fallback mechanism may only be applied at the initial transmission of pending packets. For example, in some implementations, once a UL configured grant configuration(s) is selected for the initial transmission of a pending packet, the UE may transmit the following (HARQ/ARQ) re-transmissions (e.g., of the same packet) through the same UL configured grant configuration. Moreover, the UE may not be allowed to fallback to a random access procedure for the following (ARQ/HARQ) re-transmission.

In some other implementations, once a random access procedure is selected for the initial transmission of a pending packet, the UE may transmit the following (HARQ/ARQ) re-transmissions (e.g., of the same packet) through the random access procedure as well. Moreover, the UE may not be allowed to access UL configured grant for the following (ARQ/HARQ) re-transmissions. More specifically, the UE may consider the configured grant to be invalid while performing the random access procedure.

In some implementations, the UE may be configured with multiple UL configured grant configurations. In some such implementations, the initial transmission and the following (HARQ/ARQ) re-transmissions of a pending packet may only be allowed to be transmitted based on the same UL configured grant configuration (e.g., associated with a UL-CG index). In some other implementations, the initial transmission and the following (HARQ/ARQ) re-transmissions of the pending packet may be allowed to be transmitted based on the different UL configured grant configurations (e.g., associated with more than one UL-CG index). Alternatively, the payload size (or TB size) of the later UL configured grant may need to be larger than the payload size (or TB size) of the previous UL configured grant.

Release Mechanism

In some implementations, a UE that is configured with UL configured grant for small data transmission during an RRC_INACTIVE state may release the stored configuration associated with the small data transmission through a 2-step/4-step contention-based/contention-free random access procedure and/or the stored UL configured grant configuration. In some implementations, an AS security error may happen during the (small) packet transmission. For example, the UE may update an AS security key (e.g., $K_{gNB}$) and its corresponding parameter, such as the Next Hop Chaining Counter (NCC) parameter for next hop access key derivation (e.g., based on the parameter 'NextHopChainingCount', which may be transmitted by the serving cell in the IE 'suspend-config' within the RRCRelease message while the serving cell instructs the UE to move to the RRC_INACTIVE state). However, an AS security error may happen while the UE is implementing (small) packet transmission in the RRC_INACTIVE state (e.g., packet transmission by applying a 2-step/4-step random access procedure or by applying the stored UL configuration grant configuration).

Under such a condition (e.g., when an AS security error occurs), the UE may release the stored configuration associated with small data transmission during the RRC_INACTIVE state (e.g., the stored random access resource configuration and/or the UL configured grant configuration for packet transmission during the RRC_INACTIVE state). In some implementations, the UE may move to an RRC_IDLE state when an AS security error event occurs (e.g., the UE may report the AS security error event to the upper layer). Then, the upper layer may instruct the UE to move to an RRC_IDLE state or the RRC entity may move to the RRC_IDLE state automatically). Moreover, the UE may also initiate an RRC (Connection) Establishment procedure to the serving cell by initiating a random access procedure (e.g., while the UE sends a selected preamble to the serving cell) and sending an RRC (Connection) Setup Request message to the serving cell.

In some implementations, the (RRC_INACTIVE) UE may initiate an RRC (connection) resume procedure with the serving cell by initiating a random access procedure (e.g., while the UE is sending a selected preamble to the serving cell) and sending an RRC (Connection) Resume Request message to the serving cell. Furthermore, the UE may report the AS security error event (for small data transmission) to the serving cell (e.g., in the RRC(Connection) Setup Complete message or the RRC (Connection) Resume Complete message).

In some implementations, the UE may transmit (small) packet to the serving cell during random access procedure based on stored configuration (e.g., through a random access procedure or through the stored UL configured grant configuration). However, the UE may receive from the serving cell an RRC (Connection) Setup message, which instructs the UE to re-build the RRC Connection with the serving cell. In such a condition, the UE may move to an RRC_IDLE state and remove the pending data in the buffer of the MAC entity and so stop/release the timers/counters configured for SDT procedure. Moreover, the stored configuration related to (small) packet transmission during the RRC_INACTIVE state may also be released in such a condition. Then, the UE may reply with an RRC Connection Setup Complete message to the serving cell in some implementations.

In some implementations, the UE may transmit (small) packet to the serving cell during a random access procedure based on stored configuration (e.g., through a random access procedure or through the stored UL configured grant configuration). However, the UE may receive an RRC (Connection) resume message from the serving cell, which may instruct the UE to resume the RRC Connection with the serving cell. In such a condition, the UE may reply with an RRC (connection) Resume Complete message to the serving cell and may then move to an RRC_CONNECTED state. It is also worthy to note that, in some implementations, the pending data in the buffer of the MAC entity may still be maintained during the RRC Connection Resume procedure. Moreover, the stored configuration related to (small) packet transmission during the RRC_INACTIVE state may also be maintained. In some implementations, the pending data in the buffer of the MAC entity may still be removed during the RRC Connection Resume procedure. Moreover, the stored configuration related to (small) packet transmission during the RRC_INACTIVE state may or may not be removed.

Figure 5:
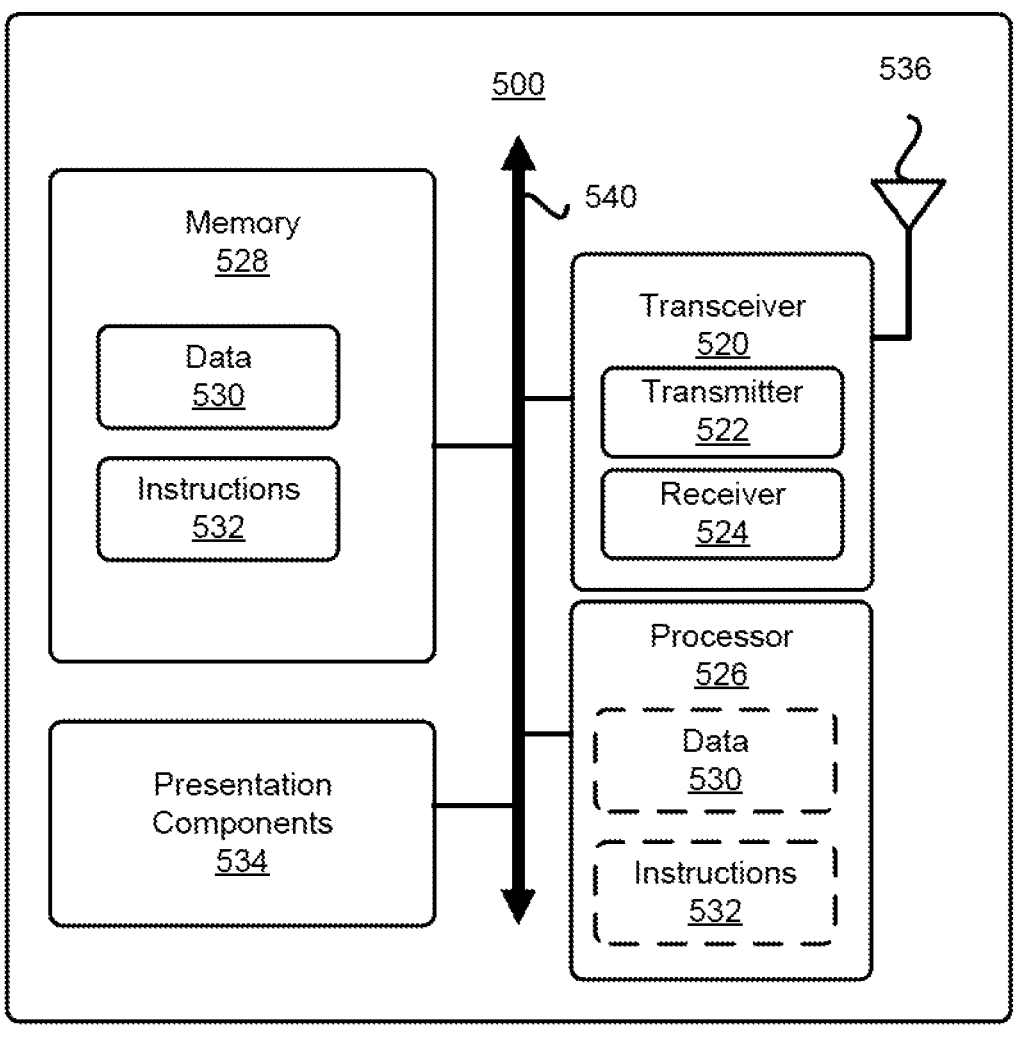
FIG. 5 illustrates a block diagram of a node for wireless communication, according to one example implementation of the present application.

FIG. 5 illustrates a block diagram of a node for wireless communication, according to one example implementation of the present application. As shown in FIG. 5, node 500 may include transceiver 520, processor 526, memory 528, one or more presentation components 534, and at least one antenna 536. Node 500 may also include a Radio Frequency (RF) spectrum band module, a base station communications module, a network communications module, and a system communications management module, input/output (I/O) ports, I/O components, and power supply (not explicitly shown in FIG. 5). Each of these components may be in communication with each other, directly or indirectly, over one or more buses 540.

Transceiver 520 having transmitter 522 and receiver 524 may be configured to transmit and/or receive time and/or frequency resource partitioning information. In some implementations, transceiver 520 may be configured to transmit in different types of subframes and slots including, but not limited to, usable, non-usable, and flexibly usable subframes and slot formats. Transceiver 520 may be configured to receive data and control signaling.

Node 500 may include a variety of computer-readable media. Computer-readable media can be any available media that can be accessed by node 500 and include both volatile and non-volatile media, removable and non-removable media. By way of example, and not limitation, computer-readable media may include computer storage media and communication media. Computer storage media include both volatile and non-volatile, removable and non-removable media implemented in any method or technology for storage of information, such as computer-readable instructions, data structures, program modules, or other data. Computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media do not include a propagated data signal. Communication media typically embody computer-readable instructions, data structures, program modules, or other data in a modulated data signal, such as a carrier wave, or other transport mechanism and includes any information delivery media. The term "modulated data signal" means a signal that has one or more of its characteristics set or changed in such a manner as to encode information in the signal. By way of example, and not limitation, communication media include wired media, such as a wired network or direct-wired connection, and wireless media, such as acoustic, RF, infrared, and other wireless media. Combinations of any of the above should also be included within the scope of computer-readable media.

Memory 528 may include computer-storage media in the form of volatile and/or non-volatile memory. Memory 528 may be removable, non-removable, or a combination thereof. Exemplary memory includes solid-state memory, hard drives, optical-disc drives, etc. As illustrated in FIG. 5, memory 528 may store computer-readable, computer-executable instructions 532 (e.g., software codes) that are configured to, when executed, cause processor 526 to perform various functions described herein, for example, with reference to FIGS. 1 through 5. Alternatively, instructions 532 may not be directly executable by processor 526 but be configured to cause node 500 (e.g., when compiled and executed) to perform various functions described herein.

Processor 526 may include an intelligent hardware device, for example, a central processing unit (CPU), a microcontroller, an ASIC, etc. Processor 526 may include memory. Processor 526 may process data 530 and instructions 532 received from memory 528, and information through transceiver 520, the baseband communications module, and/or the network communications module. Processor 526 may also process information to be sent to transceiver 520 for transmission through antenna 536, to the network communications module for transmission to a core network.

One or more presentation components 534 present data indications to a person or other device. For example, one or more presentation components 534 include a display device, speaker, printing component, vibrating component, etc.

From the above description it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method performed by a user equipment (UE) for transmitting uplink (UL) data while the UE is in a radio resource control (RRC)_INACTIVE state, the method comprising:

receiving, from a serving cell, a configuration for configuring a plurality of UL resources associated with a normal UL (NUL) frequency carrier and a supplementary UL (SUL) frequency carrier of a plurality of UL frequency carriers, the plurality of UL resources comprising at least one configured grant (CG) resource and at least one random access (RA) resource;

initiating a small data transmission (SDT) procedure by selecting one of the NUL frequency carrier or the SUL frequency carrier for transmitting at least one UL packet;

performing the SDT procedure while the UE is in the RRC_INACTIVE state to transmit, to the serving cell, the at least one UL packet on the selected one of the NUL frequency carrier or the SUL frequency carrier via the at least one CG resource or the at least one RA resource, wherein:

in a case that the at least one CG resource associated with the selected one of the NUL frequency carrier or the SUL frequency carrier is available, the at least one UL packet is transmitted via the at least one CG resource, and in a case that the at least one CG resource associated with the selected one of the NUL frequency carrier or the SUL frequency carrier is not available and the at least one RA resource is associated with the selected one of the NUL frequency carrier or the SUL frequency carrier the at least one UL packet is transmitted via the at least one RA resource; and stopping the SDT procedure in a case that at least one predefined condition is fulfilled.

2. The method of claim 1, wherein the at least one predefined condition comprises at least one of the following:

a cell reselection has occurred:

an access stratum (AS) security error has occurred;

receiving an indication that a maximum number of retransmissions in a radio link control (RLC) layer has been reached;

a random access problem has occurred; or a timing advanced (TA) timer associated with a UL CG for the SDT procedure has expired.

3. The method of claim 1, wherein selecting the one of the NUL frequency carrier or the SUL frequency carrier comprises selecting any one of the NUL frequency carrier or the SUL frequency carrier with which the at least one CG resource is associated based on the at least one CG resource having a higher priority than the at least one RA resource.

4. The method of claim 1, wherein selecting the one of the NUL frequency carrier or the SUL frequency carrier comprises selecting any one of the NUL frequency carrier or the SUL frequency carrier with which the at least one RA resource is associated in a case that:

the at least one CG resource is not available, or the UE receives an indication from the serving cell that indicates to the UE to fallback from the at least one CG resource to the at least one RA resource for transmitting the at least one UL packet.

5. The method of claim 1, wherein:

the at least one RA resource comprises one of a 2-step RA resource and a 4-step RA resource, and the UE selects one of the 2-step RA resource or the 4-step RA resource for transmitting the at least one UL packet based on a downlink (DL)-reference signal received power (RSRP) threshold associated with a type of the at least one RA resource.

6. The method of claim 5, wherein:

a first DL-RSRP threshold is configured by the serving cell to be associated with the NUL frequency carrier, a second DL-RSRP threshold is configured by the serving cell to be associated with the SUL frequency carrier, and the DL-RSRP threshold associated with the type of the at least one RA resource is further associated with the selected one of the NUL frequency carrier or the SUL frequency carrier based on the first DL-RSRP threshold or the second DL-RSRP threshold.

7. The method of claim 1, wherein selecting the one of the NUL frequency carrier or the SUL frequency carrier comprises:

receiving, from the serving cell, through dedicated control signaling, a downlink (DL)-reference signal received power (RSRP) threshold;

selecting the one of the NUL frequency carrier or the SUL frequency carrier based on the DL-RSRP threshold; and after selecting the one of the NUL frequency carrier or the SUL frequency carrier, selecting one of the at least one CG resource of the at least one RA resource associated with the selected one of the NUL frequency carrier or the SUL frequency carrier for transmitting the at least one UL packet to the serving cell.

8. The method of claim 1, wherein the selected one of the NUL frequency carrier or the SUL frequency carrier comprises the NUL frequency carrier, the method further comprising:

after the at least one UL packet is transmitted to the serving cell on the NUL frequency carrier, determining that the at least one UL packet is to be retransmitted to the serving cell; and retransmitting the at least one UL packet on the same NUL frequency carrier without using any other one of the plurality of UL frequency carriers, wherein retransmitting the at least one UL packet comprises one of a Hybrid Automatic Repeat Request (HARQ) retransmission or an Automatic Repeat Request (ARQ) retransmission.

9. The method of claim 1, wherein the at least one UL packet comprises a first UL packet and a second UL packet, wherein transmitting the at least one UL packet comprises:

transmitting, to the serving cell, the first UL packet on the selected one of the NUL frequency carrier or the SUL frequency carrier, and transmitting, to the serving cell, the second UL packet on the same selected one of the NUL frequency carrier or the SUL frequency carrier without using any other one of the plurality of UL frequency carriers.

10. A user equipment (UE), comprising:

at least one processor; and one or more non-transitory computer-readable media coupled to the at least one processor and storing one or more computer-executable instructions that, when executed by the at least one processor, cause the UE to:

receive, from a serving cell, a configuration for configuring a plurality of uplink (UL) resources associated with a normal UL (NUL) frequency carrier and a supplementary UL (SUL) frequency carrier of a plurality of UL frequency carriers, the plurality of UL resources comprising at least one configured grant (CG) resource and at least one random access (RA) resource;

initiate a small data transmission (SDT) procedure by selecting one of the NUL frequency carrier or the SUL frequency carrier for transmitting at least one UL packet;

perform the SDT procedure while the UE is in a radio resource control (RRC)_INACTIVE state to transmit, to the serving cell, the at least one UL packet on the selected one of the NUL frequency carrier or the SUL frequency carrier via the at least one CG resource or the at least one RA resource, wherein:

in a case that the at least one CG resource associated with the selected one of the NUL frequency carrier or the SUL frequency carrier is available, the at least one UL packet is transmitted via the at least one CG resource, and in a case that the at least one CG resource associated with the selected one of the NUL frequency carrier or the SUL frequency carrier is not available and the at least one RA resource is associated with the selected one of the NUL frequency carrier or the SUL frequency carrier, the at least one UL packet is transmitted via the at least one RA resource; and stop the SDT procedure in a case that at least one predefined condition is fulfilled.

11. The UE of claim 10, wherein the at least one predefined condition comprises at least one of the following:

a cell reselection has occurred;

an access stratum (AS) security error has occurred;

receiving an indication that a maximum number of retransmissions in a radio link control (RLC) layer has been reached;

a random access problem has occurred; or a timing advanced (TA) timer associated with a UL CG for the SDT procedure has expired.

12. The UE of claim 10, wherein selecting the one of the NUL frequency carrier or the SUL frequency carrier comprises selecting any one of the NUL frequency carrier or the SUL frequency carrier with which the at least one CG resource is associated based on the at least one CG resource having a higher priority than the at least one RA resource.

13. The UE of claim 10, wherein selecting the one of the NUL frequency carrier or the SUL frequency carrier comprises selecting any one of the NUL frequency carrier or the SUL frequency carrier with which the at least one RA resource is associated in a case that:

the at least one OG resource is not available, or the UE receives an indication from the serving cell that indicates to the UE to fallback from the at least one CG resource to the at least one RA resource for transmitting the at least one UL packet.

14. The UE of claim 10, wherein:

the at least one RA resource comprises one of a 2-step RA resource and a 4-stop RA resource, and the UE selects one of the 2-step RA resource or the 4-step RA resource for transmitting the at least one UL packet based on a downlink (DL)-reference signal received power (RSRP) threshold associated with a type of the at least one RA resource.

15. The UE of claim 14, wherein:

a first DL-RSRP threshold is configured by the serving cell to be associated with the NUL frequency carrier, a second DL-RSRP threshold is configured by the serving cell to be associated with the SUL frequency carrier, and the DL-RSRP threshold associated with the type of the at least one RA resource is further associated with the selected one of the NUL frequency carrier or the SUL frequency carrier based on the first DL-RSRP threshold or the second DL-RSRP threshold.

16. The UE of claim 10, wherein selecting the one of the NUL frequency carrier or the SUL frequency carrier comprises:

receiving, from the serving cell, through dedicated control signaling, a downlink (DL)-reference signal received power (RSRP) threshold;

selecting the one of the NUL frequency carrier or the SUL frequency carrier based on the DL-RSRP threshold; and after selecting the one of the NUL frequency carrier or the SUL frequency carrier, selecting one of the at least one CG resource or the at least one RA resource associated with the selected one of the NUL frequency carrier or the SUL frequency carrier for transmitting the at least one UL packet to the serving cell.

17. The UE of claim 10, wherein the selected one of the NUL frequency carrier or the SUL frequency carrier comprises the NUL frequency carrier, wherein the at least one processor is further configured to execute the one or more computer-executable instructions to:

after the at least one UL packet is transmitted to the serving cell on the NUL frequency carrier, determine that the at least one UL packet is to be retransmitted to the serving cell using the NUL frequency carrier; and retransmit the at least one UL packet one the same NUL frequency carrier without using any other one of the plurality of UL frequency carriers, wherein retransmitting the at least one UL packet comprises one of a Hybrid Automatic Repeat Request (HARQ) retransmission or an Automatic Repeat Request (ARQ) retransmission.

18. The UE of claim 10, wherein the at least one UL packet comprises a first UL packet and a second UL packet, wherein transmitting the at least one UL packet comprises:

transmitting, to the serving cell, the first UL packet on the selected one of the NUL frequency carrier or the SUL frequency carrier, and transmitting, to the serving cell, the second UL packet on the same selected one of the NUL frequency carrier or the SUL frequency carrier without using any other one of the plurality of UL frequency carriers.

* * * * *